(12) United States Patent
Fidali et al.

(10) Patent No.: US 7,834,851 B1
(45) Date of Patent: Nov. 16, 2010

(54) COMPUTER MOUSE THAT PREVENTS OR TREATS CARPAL TUNNEL SYNDROME AND METHODS OF USE

(75) Inventors: Wlodzimierz Fidali, Brooklyn, NY (US); Robert T. Logan, New York, NY (US)

(73) Assignee: Senduzy Corp., New York, NY (US)

( * ) Notice: Subject to any disclaimer, the term of this patent is extended or adjusted under 35 U.S.C. 154(b) by 0 days.

(21) Appl. No.: 12/830,117

(22) Filed: Jul. 2, 2010

Related U.S. Application Data

(63) Continuation-in-part of application No. 12/637,518, filed on Dec. 14, 2009, now Pat. No. 7,757,998.

(51) Int. Cl.
*G06F 3/033* (2006.01)
*B68G 5/00* (2006.01)
(52) U.S. Cl. .................................... 345/163; 248/118
(58) Field of Classification Search ............... 248/118, 248/118.1, 118.3, 118.5, 918, 346.03, 686; 345/163
See application file for complete search history.

(56) References Cited

U.S. PATENT DOCUMENTS

| | | | |
|---|---|---|---|
| 5,131,614 A | 7/1992 | Garcia et al. | |
| 5,433,407 A | 7/1995 | Rice | |
| 5,788,195 A | 8/1998 | Rice | |
| 5,913,497 A | 6/1999 | Myers | |
| 6,157,370 A * | 12/2000 | Kravtin et al. | 345/163 |
| 6,431,504 B1 | 8/2002 | Ignagni | |
| 6,441,805 B1 * | 8/2002 | Reid et al. | 345/163 |
| D494,590 S | 8/2004 | Richter | |
| 7,025,310 B2 | 4/2006 | Bouchard | |
| 2003/0169236 A1 | 9/2003 | Crocker | |

* cited by examiner

*Primary Examiner*—Terrell Mckinnon
*Assistant Examiner*—Erin Smith
(74) *Attorney, Agent, or Firm*—American Patent Agency; Daniar Hussain

(57) ABSTRACT

A new computer mouse is disclosed to prevent strain injuries to the hand and wrist and prevent or alleviate the symptoms associated with Carpel Tunnel Syndrome (CTS) for those who are repetitive users of computer mouse devices. The mouse is designed to leave the carpal tunnel of a user of the mouse substantially open, thus precluding tunnel narrowing and the symptoms resulting therefrom. The mouse is also designed to maximize comfort of the user, alleviate wrist bend associated with use of the mouse, and is adaptable to different size hands.

25 Claims, 25 Drawing Sheets

COMPUTER MOUSE THAT PREVENTS OR TREATS CARPAL TUNNEL SYNDROME AND METHODS OF USE

REFERENCE TO RELATED APPLICATIONS

This application is a Continuation-in-Part (CIP) of U.S. Ser. No. 12/637,518, filed on Dec. 14, 2009, which has issued as U.S. Pat. No. 7,757,998 on Jul. 20, 2010, the entirety of which is hereby incorporated by reference herein.

BACKGROUND OF THE INVENTION

The carpal tunnel is a narrow tunnel in the wrist formed by ligament and bone. Passing through the carpal tunnel is the median nerve, which carries impulses from the brain into the hand. Tendons in the hand which enable the hand to close also pass through the carpal tunnel. These tendons, when stressed, swell inside the carpal tunnel and compress the median nerve. Compression of the median nerve leads to numbness or weakness of the hand. Ultimately, if not treated, theses symptoms lead to carpal tunnel syndrome (CTS). CTS may be caused by a variety of factors. Activities that require the wrist to remain in extended, flexed or exaggerated positions for significant periods of time may lead to CTS.

The symptoms of CTS are a tingling, numbness of the hand between the thumb and part of the ring finger accompanied by pain that travels up the forearm from the wrist. There is a potential of permanent numbness and limited movement of the fingers associated with CTS. Subsequent treatment requires a splint to be worn about the wrist, cortisone injections and in some cases operations to relieve the pain.

CTS has become an increasingly significant problem as computers have become a mainstay in the home and in the office environment. Repetitive use of the computer mouse and other input devices has added to the problem. Handed versions of the mouse are designed specifically to the contours of either the right or the left hand. In use, the palm of the hand caresses the mouse with the Carpal Tunnel part of the hand squeezed in place by the flesh below the thumb ("Thenar Eminence") and the flesh below the pinky ("Hypthenar Eminence"). Continued use of the mouse in this position causes the Carpal Tunnel to become very narrow which inflames tissues which then press against nerves which in turn cause pain, numbness and weakness, often resulting in CTS. Additionally, if a mouse, trackball or other input device is placed too far away, too high, too low, or too much on one side from the user the position can cause shoulder, wrist, elbow and forearm discomfort. Repetitive movement of the shoulder and arm often results in posture related problems other than CTS.

It has been postulated that improper wrist posture when using a computer keyboard or mouse has contributed towards the development of CTS. If the keyboard or mouse is placed on a flat surface such as a table, the user's wrist will be bent. Such bending of the wrist places significant stress on the wrist muscles. Solutions to mitigate wrist bending while using a mouse are known in the art. For example, U.S. Pat. No. 5,131,614 to Garcia discloses a wrist support for alleviating stress-related problems associated with the use of a computer mouse. U.S. Pat. No. 7,025,310 to Bouchard discloses a hand and wrist support device to be used with a mouse. The device is designed to allow operation of the mouse with the user's fingers with hand and wrist positioned on the device remaining on a horizontal plane, stationary and relaxed. In use, the user's wrist rests on an elevated surface that is adapted to accommodate the mouse. U.S. Pat. No. 5,433,407 to Rice which is incorporated by reference herein, also discloses an attachment to be used with a mouse that alleviates posture- and stress-related disorders associated with use of a mouse. The attachment described in U.S. Pat. No. 5,433,407 is a curved-shape palm rest that has a back and top portion and side walls. The walls form a cavity which is able to accept a portion of the mouse. The user's palm is placed on the palm rest which allows the fingers to control the attached mouse. According to U.S. Pat. No. 5,433,407, this position encourages an essentially straight path between the elbow, wrist and hand of the user, hence reducing wrist bend and stress to the carpal tunnel.

Accordingly, prior art methods of reducing CTS associated with the use of a mouse or other input device have relied on supporting the palm, wrist, forearm and/or shoulder to alleviate stress which is supposed to result is less fatigue. While the prior art methods have partially succeeded in alleviating or delaying symptoms associated with CTS, they have not addressed the underlying problem, that is, keeping the carpal tunnel open. In prior art methods described above, the palm is in direct contact with the 'free' mouse or the mouse attachment. For instance, in U.S. Pat. No. 5,433,407, the disclosed palm rest has a curvilinear upper section where the user rests his or her palm. The design allows the user's hand to conform to the shape of the palm rest. However, such a configuration provides little or no space between the palm of the hand and the palm rest. Moreover, as discussed with respect to the 'free' mouse, the carpal tunnel part of the hand in direct contact with the palm rest is squeezed in place, resulting in significant tunnel narrowing, ultimately leading to CTS and other posture related problems.

Thus, what is needed is a means of significantly alleviating or eliminating CTS and other stress-related disorders resulting from the use of a computer mouse and other input devices. The solution to the problem must be a device that is easy to use, comfortable, adaptable to various input devices, and addresses the underlying problems that result in CTS.

SUMMARY OF INVENTION

In accordance with these objectives, a new computer mouse has now been developed to prevent strain injuries to the hand and wrist and prevent or alleviate the symptoms associated with CTS for those who are repetitive users of computer mouse devices. The computer mouse is designed to leave the carpal tunnel of the user of a computer mouse substantially open, thus precluding tunnel narrowing and the symptoms resulting therefrom. The computer mouse is also designed to maximize comfort of the user, alleviate wrist bend associated with use of the mouse, and be adaptable to different size hands.

One aspect of the current invention is a computer mouse comprising a base for sliding movement on a surface, said base having a front section and a rear section, said rear section having two symmetrical rounded areas that curve inward at the interior of the base thereby forming a natural space there between. The base is mechanically attached to an upper curved surface for support of the fingers and upper palm area of a user's hand. The rear section of the base provides support for the lower palm area of a user's hand and the natural space keeps the carpal tunnel of the hand substantially open.

Another aspect of the current invention is a computer mouse comprising a base for sliding movement on a surface, said base having a front section and a rear section, said rear section having two symmetrical rounded areas that curve inward at the interior of the base thereby forming a natural space there between. The base is attached to two cushions. In one embodiment, the cushions are shaped in the form of a human palm. The base is mechanically attached to an upper curved surface for support of the fingers and upper palm area of a user's hand. The rear section of the base provides support for the lower palm area of a user's hand and the natural space keeps the carpal tunnel of the hand substantially open.

Another aspect of the current invention is a kit for assembling a mouse comprising two individual components. The first component is a mouse body having a base for sliding movement on a surface, said base having a front section and a rear section, said rear section having two symmetrical rounded areas that curve inward at the interior of the base thereby forming a natural space there between, and an upper curved surface for support of the fingers and upper palm area of a user's hand, said curved surface mechanically adhered to the front section of the base, wherein the two symmetrical areas have two foam layers adhered thereto. The second component of the kit includes two cushions with a bottom surface adapted to be adhered to the upper surface of the foam layers. In one embodiment, the cushions are configured to be shaped in the form of a human palm.

DETAILED DESCRIPTION OF THE INVENTION

One embodiment of this invention provides for an ergonomic accoutrement (attachment) to a computer mouse or other input device. Another embodiment of this invention provides for an ergonomic computer mouse. Both embodiments are designed to prevent strain injuries to the hand and wrist and to prevent the development of carpal tunnel syndrome (CTS) for frequent users of the mouse.

Our design of the computer mouse (or computer mouse accoutrement) began with substantial observations related to the natural, unstressed state of the carpal tunnel. We observed that space for the carpal tunnel is maintained when the hand is in a natural state. Conversely, when the thumb and pinky finger come together the carpal tunnel is closed and if held in that position will eventually cause pain. Our review of the natural shape of the hand showed that the palm is being placed in an unnatural position by holding a computer mouse against the carpal tunnel. Use of a computer mouse requires the palm to caress the mouse to move the cursor on the screen. The cheeks of the palm (Abductor Digiti Minimi and Abductor Pollicis Bravis) are squeezed to the center, reducing the space of the carpal tunnel.

Figure 1:
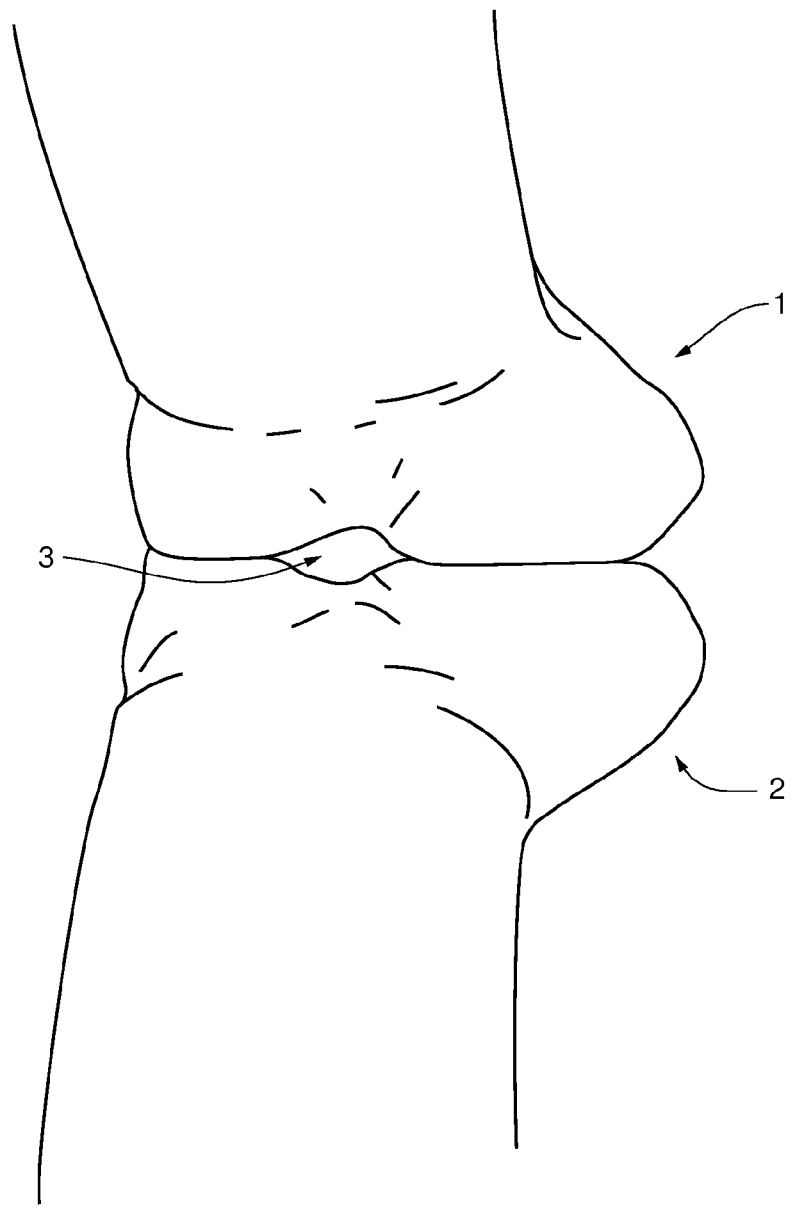
FIG. 1 illustrates the space created when two palms are clasped together.

The carpal tunnel should instead be maintained to keep it from squeezing onto itself, thus preventing tunnel narrowing. Hence, our design of the computer mouse (or accoutrement) began with the premise that the space for the carpal tunnel must remain open while still providing the user with comfort and ease of use. Consequently, using nature as our motivation for developing a prototype, we recognized that placing the palms of the hands together (FIG. 1) effectively keeps the carpal tunnel sufficiently open and prevents the tunnel from squeezing onto itself. In FIG. 1, the palm of hand 1, when placed directly on top of the palm of hand 2 creates a space 3 between the two palms. Space 3 insures that the carpal tunnel of both hands 1 and 2 is left open, and thereby, does not come into contact with the other hand. Anatomically speaking, the cheeks of the palm of the lower hand 2, referred to as Abductor Digiti Minimi and Abductor Pollicis Bravis, act as cushions for the cheeks of the palm of the upper hand 1, thereby maintaining space 3 for the carpal tunnel. Assuming that hand 1 is the hand of the user of a computer mouse, the design of a mouse accoutrement that corresponds to the shape of the palm side of hand 2 would keep the carpal tunnel unexposed, thus eliminating tunnel narrowing.

Computer Mouse Accoutrement

One embodiment of the present invention is a computer mouse accoutrement that is designed to mimic the shape of the human palm. For example, referring again to FIG. 1, the shape of the accoutrement is designed to resemble the anatomy of the palm of hand 2, where hand 1 depicts the user's hand. When the hand of the user is placed on the accoutrement, the space for the carpal tunnel is maintained, preventing any squeezing of the tunnel which causes eventual damage to the hand, wrist and forearm.

Figure 2:
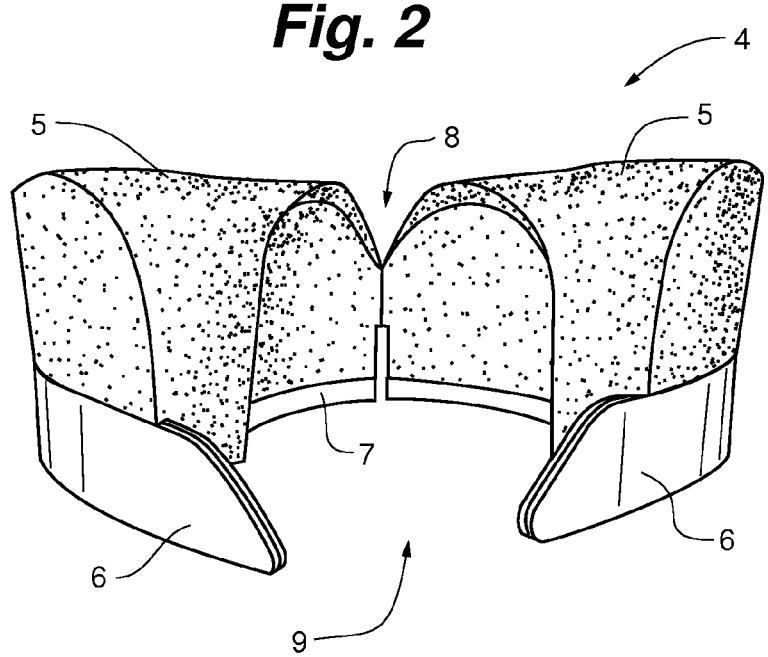
FIG. 2 illustrates a front view of the mouse accoutrement of the present invention.

FIG. 2 shows a preferred embodiment of the present invention. In FIG. 2, a front view of accoutrement 4 is shown. Accoutrement 4 has two cushions, 5, which are each adapted to fit into separate receptacles 6. The receptacles, when physically attached by a spring 7, create an open space (crevice) 8 directly between the two cushions 5. The space ranges from about three eighths of an inch to about seven eighths of an inch. As will be discussed in greater detail below, the cushions are preferably designed to emulate the shape of the human palm. The hand of a user rests on cushions 5 and the center of the palm is essentially aligned with the open space 8 between the cushions. A cavity 9 is created by the two receptacles 6 holding cushions 5. Cavity 9 is adapted to accommodate a mouse or other input device.

Figure 3:
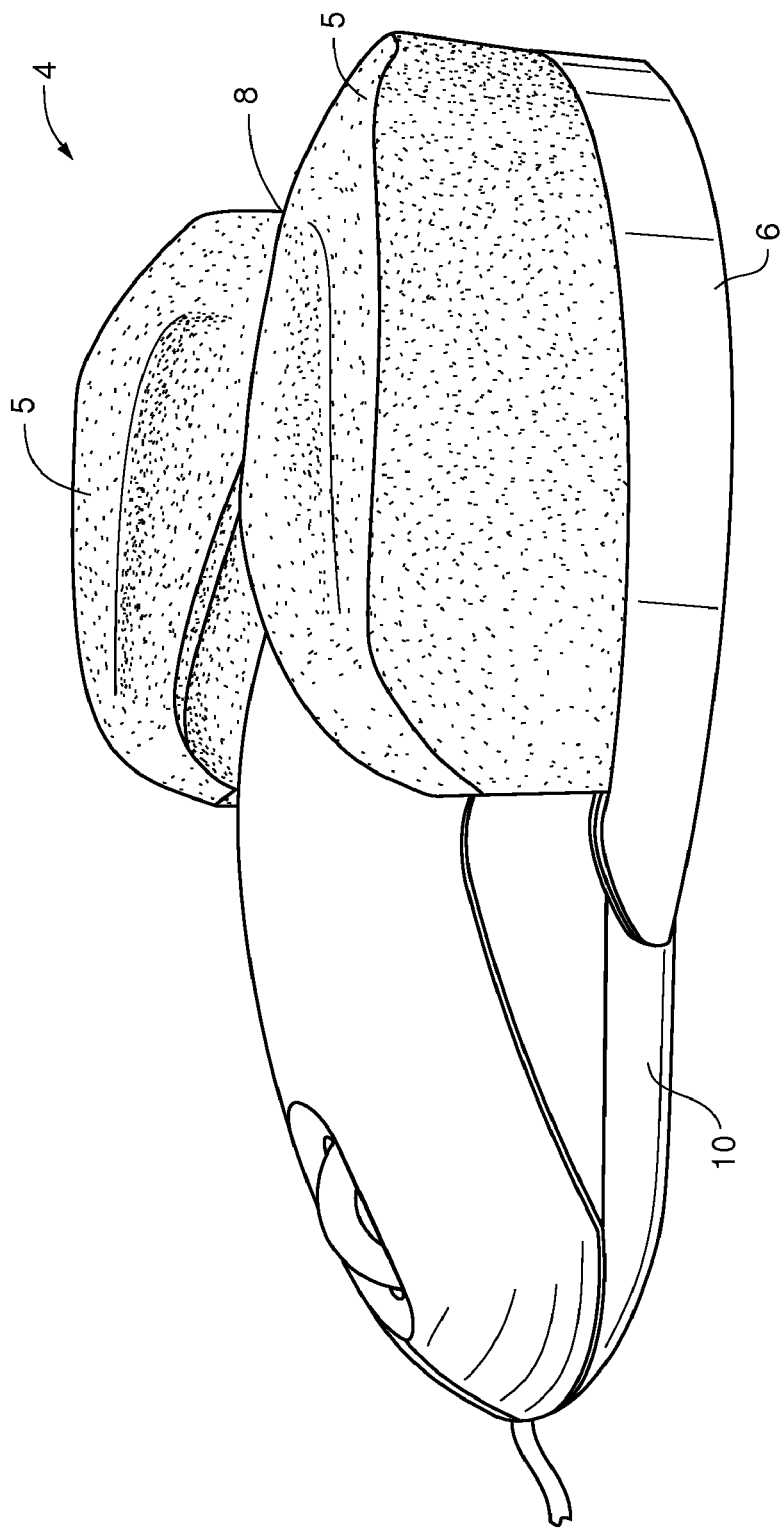
FIG. 3 illustrates a side view of the mouse accoutrement of the present invention with an attached mouse.
Figure 4:
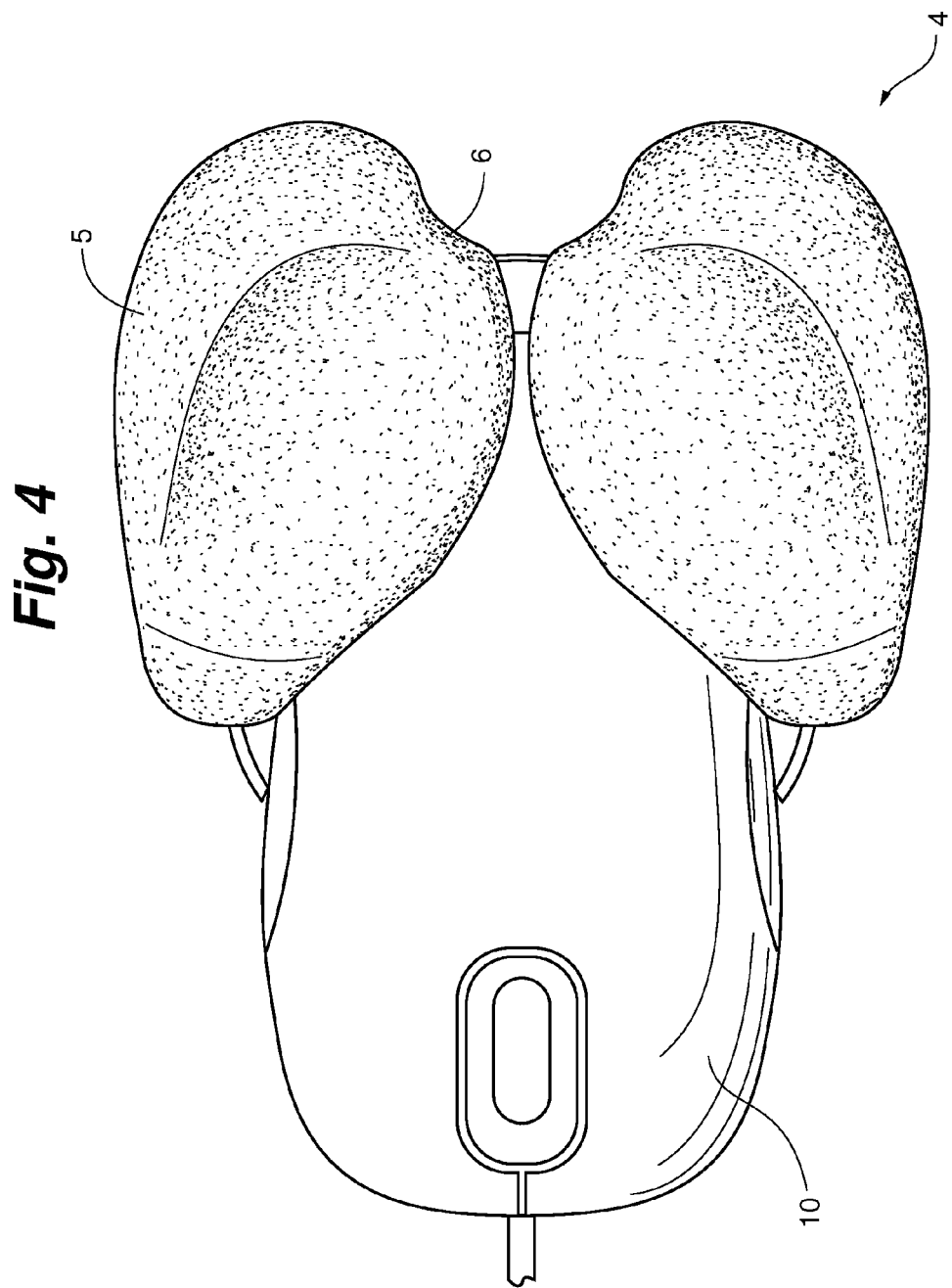
FIG. 4 illustrates a top view of the mouse accoutrement of the present invention with an attached mouse.
Figure 5:
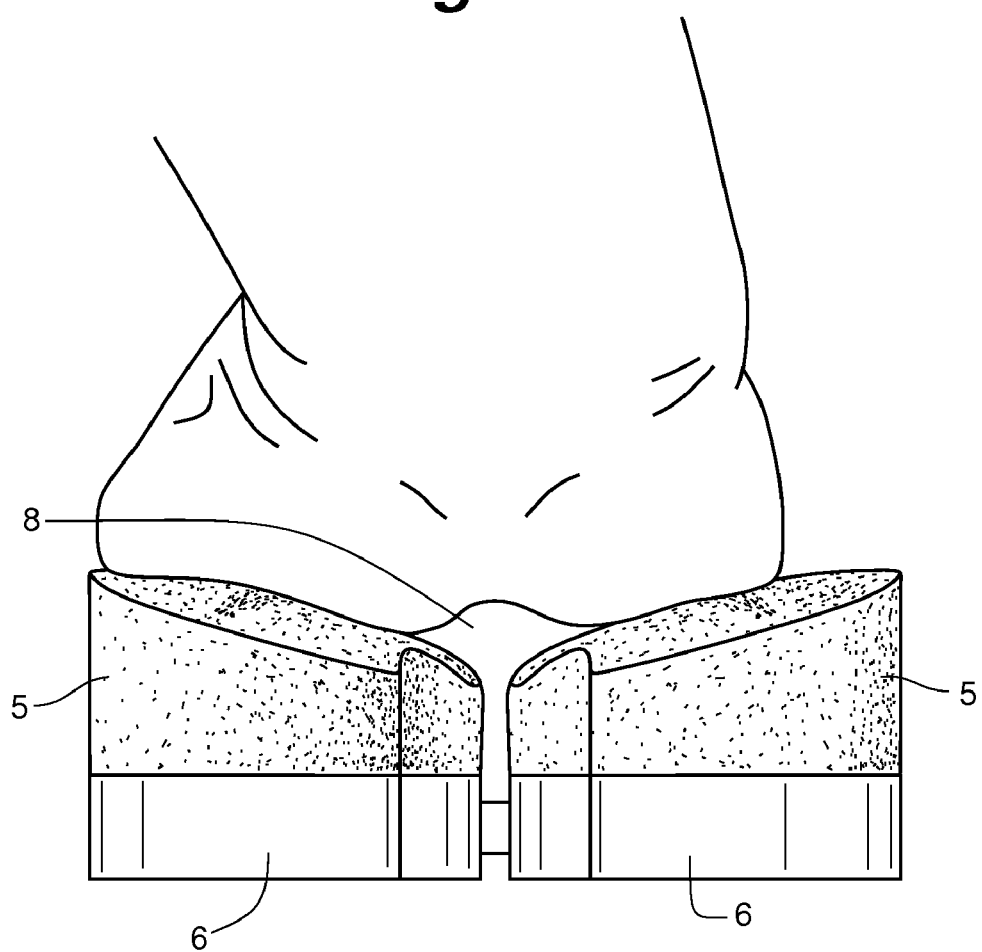
FIG. 5 illustrates a backside view of a user's hand on the mouse accoutrement of the present invention.

FIG. 3 depicts a side view of mouse accoutrement 4 with attached mouse 10. The mouse 10 fits directly into the cavity created by the two receptacles 6. The spring-like mechanism (not shown) holding the receptacles 6 together is flexible enough to accommodate a computer mouse or input devices of varying sizes. The spring closes so that the receptacles 6 perfectly accommodate the mouse, with no space between the receptacles and the mouse. A top view of mouse 10 in accoutrement 4 is shown in FIG. 4. Here it can be seen that the walls of receptacle 6 abut the sides of attached mouse 10. FIG. 5 depicts a backside view of a user's hand placed on accoutrement 4. The palm of the user's hand rests on cushions 5 of accoutrement 4. The cushions 5 are designed to prevent the carpal tunnel of the user's palm from making any contact with the mouse. Moreover, the crevice 8 between the cushions 5 assists in ensuring that the carpal tunnel is left substantially open. Hence, the shape of the cushions 4, the shape of the palm and the presence of the crevice 8 are responsible for keeping the carpal tunnel open.

Figure 6:
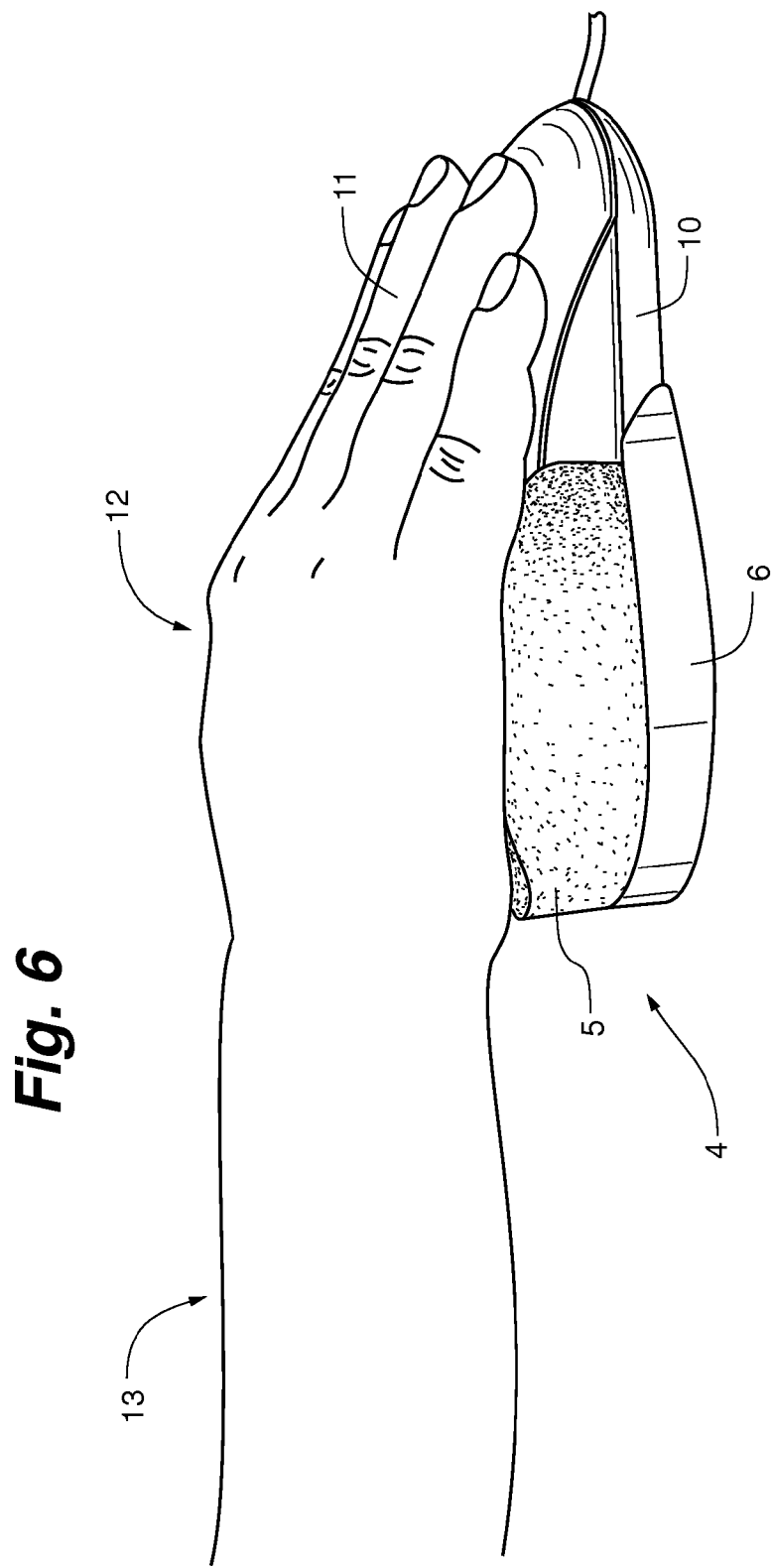
FIG. 6 illustrates a view of the mouse accoutrement of the present invention with attached mouse when in use.

FIG. 6 illustrates a view of accoutrement 4 with attached mouse 10 when in use. The relationship between the user's hand 12, fingers 11 and arm 13 are indicated in the diagram. The receptacles 6 holding cushions 5 are sized to essentially accommodate the palm of the user's hand. When the palm is placed on the cushions 5 of accoutrement 4, the fingers 11 have direct access to the front of mouse 10. This configuration allows for easy manipulation of the cursor. Moreover, the design of accoutrement 4 ensures a straight path between the arm, elbow and wrist of the user, hence mitigating the effects of wrist bend. Additionally, the configuration provides comfort to the user.

Figure 7:
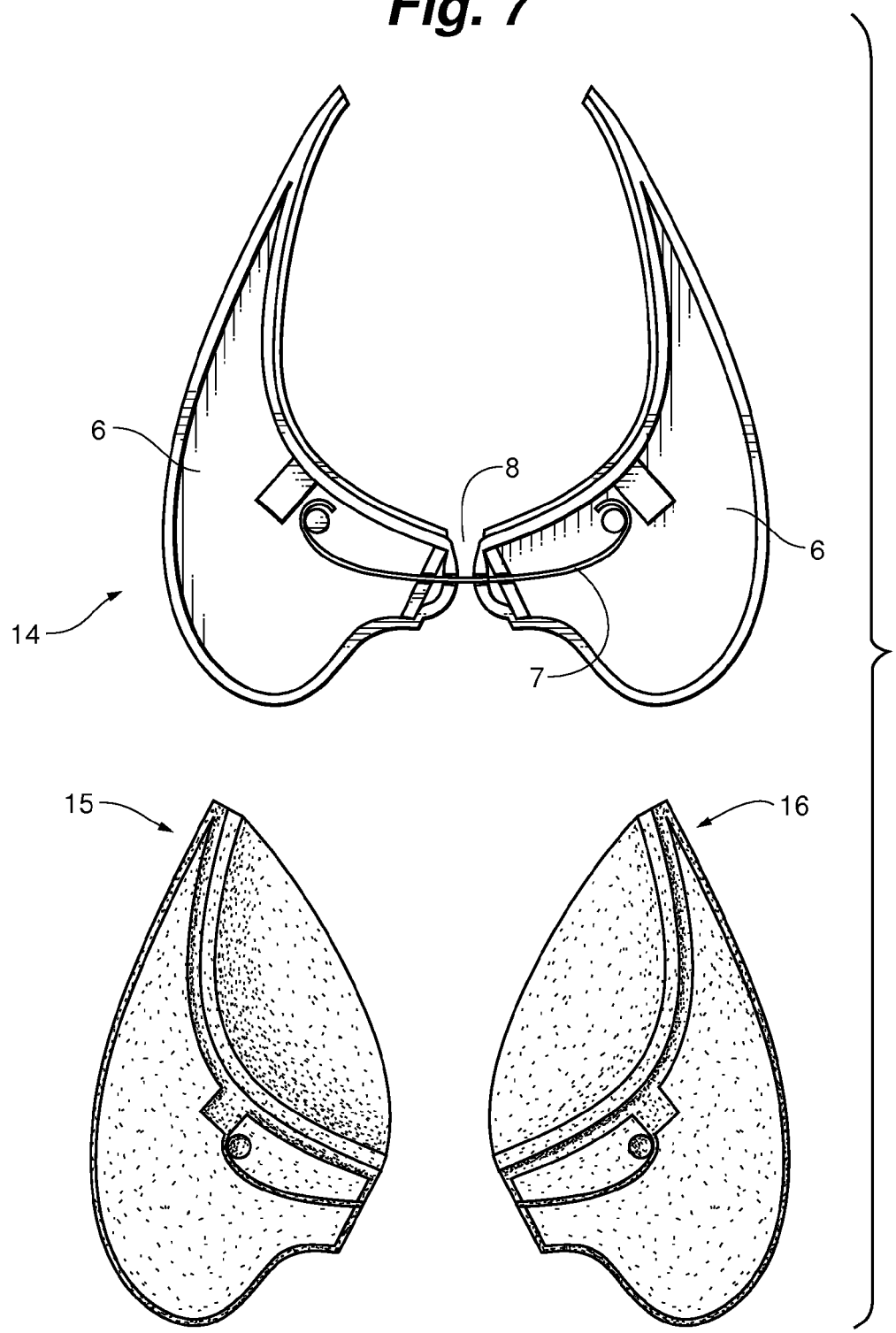
FIG. 7 illustrates a view of the receptacle and cushions of the mouse accoutrement of the present invention.

The accoutrement of the present invention may be manufactured as a single piece, with cushions and receptacles preassembled. Alternatively, the cushions and receptacles may be manufactured as separate pieces which are easily assembled by the user prior to use. FIG. 7 illustrates the embodiment where the receptacle and cushions are manufactured as separate components. In FIG. 7, the full receptacle 14 is composed of individual receptacle units 6 which are held together by spring 7 at the thorax. A crevice 8 is situated in between the two receptacle units 6. The spring 7 allows for a range of flexible motion between the individual receptacle units 6, which enables the full receptacle to accommodate different input devices. Full receptacle 14, as shown in FIG. 7, is designed to accommodate the shape of most commercial computer mouses. The other units displayed in FIG. 7 are left cushion 15 and right cushion 16. The individual cushions have an identical shape, at their bottoms, to individual receptacle units 6. Hence, the user can simply place the cushions into the receptacle units. Alternatively, if need be, the cushions can be removed from the individual receptacle units. The inner wall of the receptacle 14 may be lined with a material that facilitates placing or removing the cushions from the receptacles. In one embodiment, the inner wall of the receptacle may be lined with a felt or felt-like material.

Figure 8A:
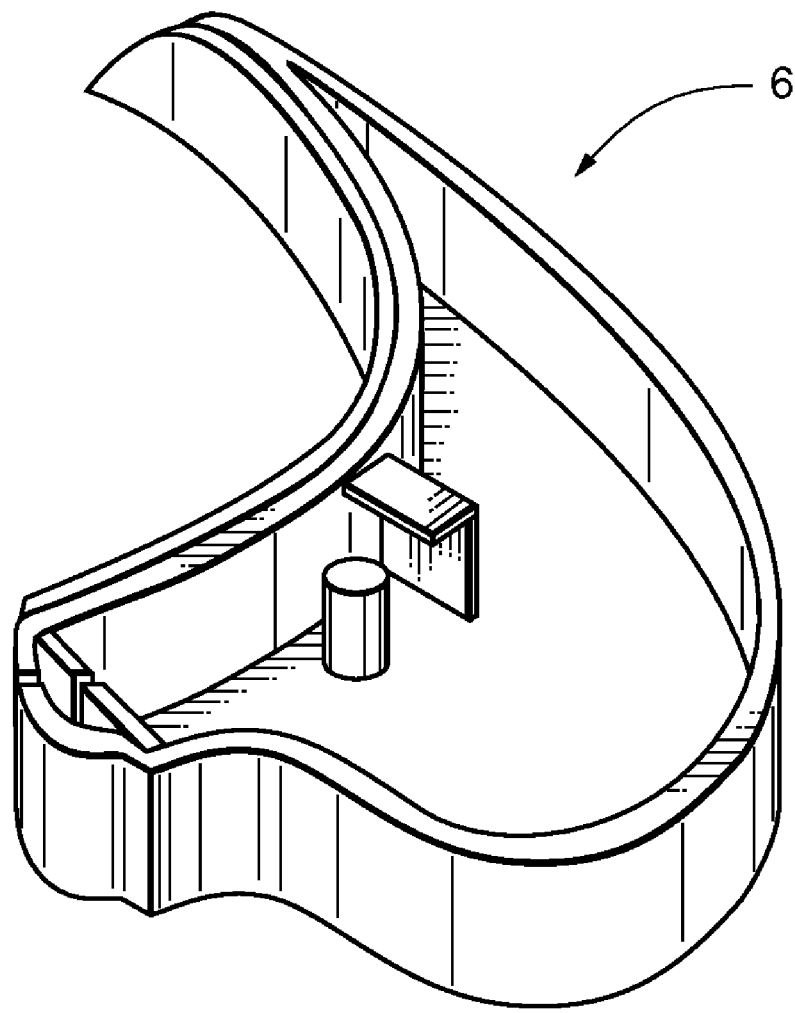
FIG. 8A illustrates a view of the right receptacle of the mouse accoutrement of the present invention.

Next, turning to the individual components of the accoutrement of the present invention, FIG. 8A shows a preferred embodiment of the left receptacle unit 6. The shape and size of the left receptacle 6 is designed to approximate the size of the right hand portion of the human palm. Hence, when left receptacle and right receptacle are assembled together as shown in FIG. 7, the assemblage approximates the full size of the human palm.

Figure 8B:
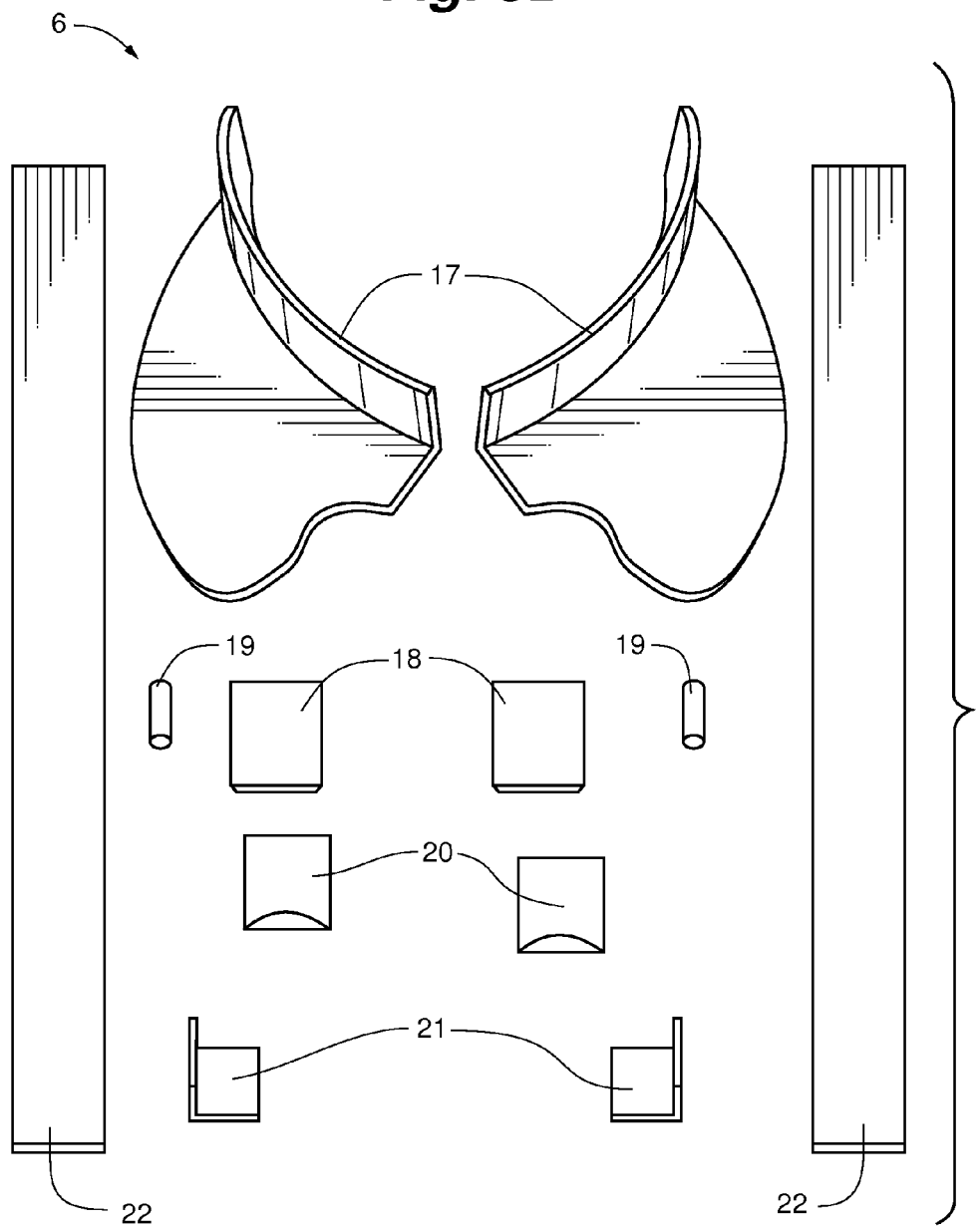
FIG. 8B illustrates a view of the component parts that comprise the receptacle of the mouse accoutrement of the present invention.

FIG. 8B illustrates a breakdown of components used in the manufacture of the receptacle units. Each receptacle unit 6 is composed of a base 17, a first end piece 18, an anchor 19, a second end piece 20 and a partition for the anchor of the spring 21 that will connect the left and right receptacle units. The inner wall 22 of the receptacle may be lined with a felt material. Anchor 19 is a plastic post glued to the base 17 and positioned to secure the end of the spring and to prevent the base from opening too wide. End piece 18 is a plastic short wall glued to the base 17 and walls 22 to secure the walls. Second end piece 20 is a plastic short curved wall glued to the end piece 18 to allow easy movement of the walls. Anchor 21 is preferably cut out of ABS plastic and glued with epoxy to the base and curve of the wall to act as a stopper for the end of the spring (see FIG. 9A). The wall may be cut out and formed from ABS plastic and then is bent to conform to the shape of the outside of the base and glued with epoxy. A grooved rubber piece about $1/16$ inches thick is glued to the inside of the walls 22 to the exact dimensions of the wall resulting in the walls gripping the sides of the mouse in a pincer-like grasp. With these components installed, the receptacle is complete and ready for the insertion of the cushion.

Figure 9A:
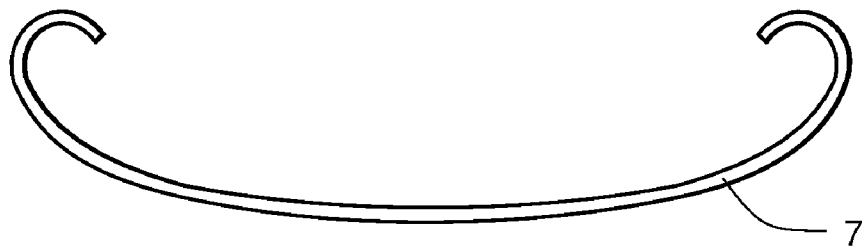
FIG. 9A illustrates an overhead view of the spring that attaches the receptacle units of the mouse accoutrement of the present invention.
Figure 9B:
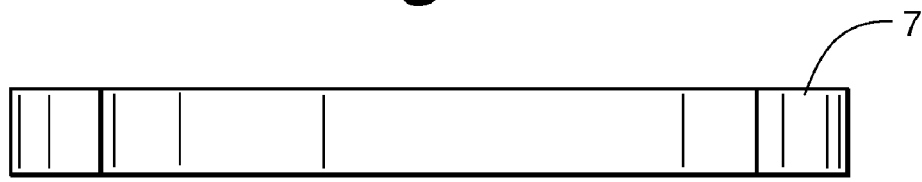
FIG. 9B illustrates a front view of the spring that attaches the receptacle units of the mouse accoutrement of the present invention.
Figure 9C:
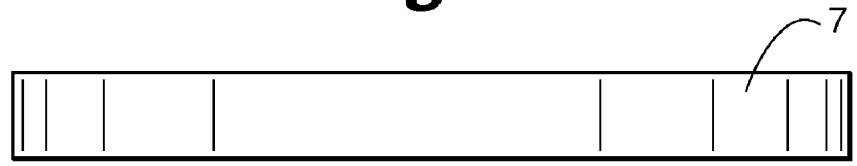
FIG. 9C illustrates a back view of the spring that attaches the receptacle units of the mouse accoutrement of the present invention.

Receptacle 6 in FIGS. 8A and 8B is preferentially made from a plastic material. In one preferred embodiment, the receptacle is made from ABS (acrylonitrile butadiene styrene) plastic. On the bottom of the receptacle are six Teflon pieces glued with contact cement to allow for easy movement on a surface. The right and left receptacles are connected with one flat metal spring 7. The preferred shape of the spring is illustrated in FIGS. 9A-C, which show an overhead, front and back view of spring 7, respectively. At each end of the spring is a slot (two walls) where the curled end of the spring is held by being secured in the slot. A wall of approximately $3/8$ inches high made of ABS plastic is glued with epoxy on the outside base of the receptacle. The wall is extended at the end of the base to grip the mouse. On the end of the inside wall is an end piece which is a half round piece of ABS plastic which is glued with epoxy to allow easy fitting by the receptacle to the mouse as each piece has a cut slot for the spring installation from one receptacle to the other receptacle. The inside of each wall may then be glued with contact cement an etched thin rubber with the same dimensions of the wall to prevent the grippers from sliding. The end of the outside wall ends in a downward point, causing pincers which grasp and hold the mouse.

Figure 10A:
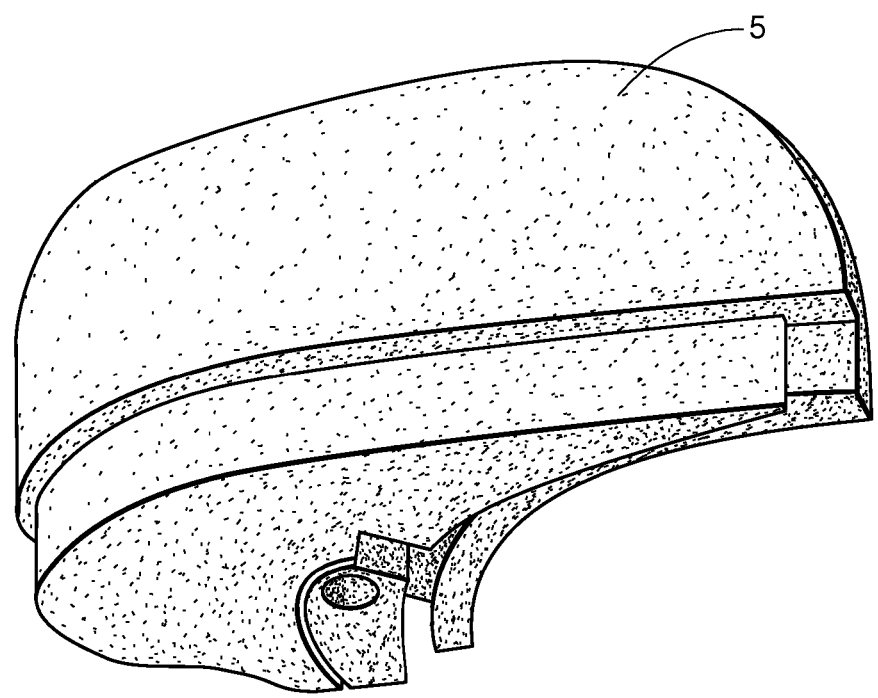
FIG. 10A illustrates a side angle of the right cushion of the mouse accoutrement of the present invention.
Figure 10B:
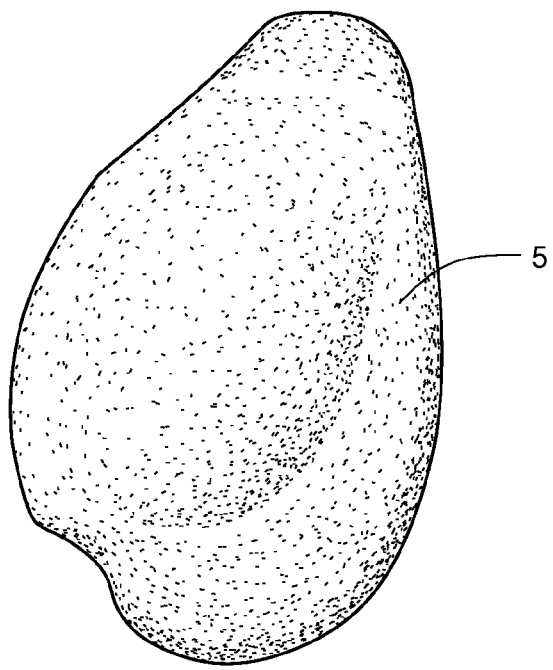
FIG. 10B illustrates a top view of the right cushion of the mouse accoutrement of the present invention.
Figure 10C:
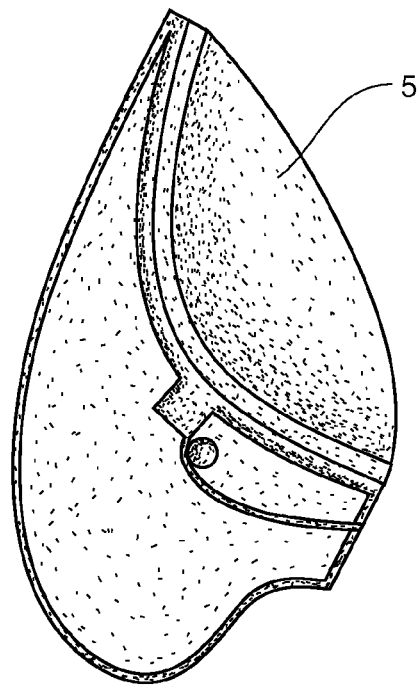
FIG. 10C illustrates an upside-down view of the right cushion of the mouse accoutrement of the present invention.

FIGS. 10A-C illustrate a preferred embodiment of the cushions of the mouse accoutrement of the present invention. FIG. 10A depicts a side view of right cushion 5. FIG. 10B depicts a top view of right cushion 5. FIG. 10C depicts a bottom view of right cushion 5. The cushions are preferably made from natural rubber or polyethylene foam, and most preferably, from natural rubber. The bottom of cushion 5 (FIG. 10C) is shaped so that it can be placed perfectly into the right receptacle (FIG. 8A). The bottom of each cushion is a cut slot which is comparable to the edge of the spring, thus allowing the cushions to be fitted into the slots of the receptacle. In a preferred embodiment, the upper portion of cushion 5 has a shape that resembles the three-dimensional anatomy of the human palm. Unlike a traditional mouse, which has a curvilinear or arched upper portion, the upper portion of cushion 5 has a topography that resembles the human palm. A mold of the human palm is preferably made from play dough. After it dries the depressions of the cheeks of the palm are matched with cushions of natural rubber. The natural rubber cushions are formed by working with electric diamond cutting flywheels and burs forming a cushion which fits snugly into the mold of the cheeks of the palm. Both cushions which fit the depression of the cheeks of the palm are then cut to fit into the receptacle FIG. 8. The shape of the cushion derived from the mold is the top of the cushion. Both cushions are shaped to maintain the natural space between the cheeks and to keep the top of the hand level while the tips of the fingers are lower than the bottom of the cheeks. In this position the natural space between the cheeks of the palm is maintained.

Figure 11:
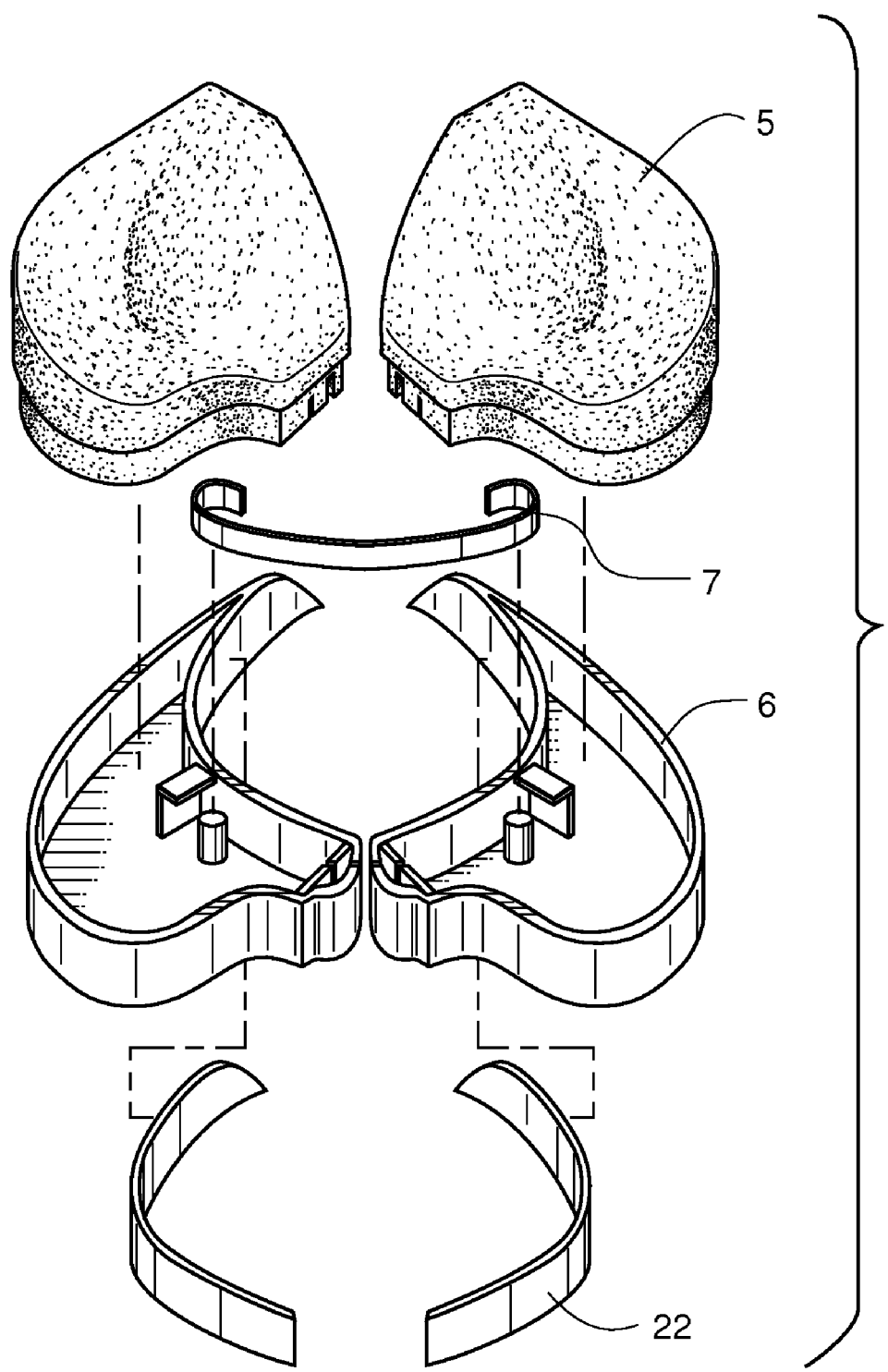
FIG. 11 illustrates the individual parts comprising the accoutrement of the present invention.

FIG. 11 depicts a preferred embodiment of the accoutrement of the present invention. As discussed above, the properly shaped cushions 5 are designed to perfectly fill the space of the receptacles 6. Spring 7 attaches the left and right receptacle units, thus allowing for flexible movement between them. A grooved rubber piece (22) approximately 1/16" thick is glued to the inside of the walls of 6 to the exact dimensions of the wall, resulting in the walls gripping the sides of the mouse. The height of the cushion will vary depending upon the comfort and size of the hand and cheeks of the palm. In a preferred embodiment, the height of the cushion is between 0.75 inches and 2 inches. In a more preferred embodiment, the height of the cushion is between 1.25 inches and 1.75 inches. To accommodate very large hands, the mouse accoutrement of the present invention may have an attachment to the bottom of the receptacle.

Figure 12A:
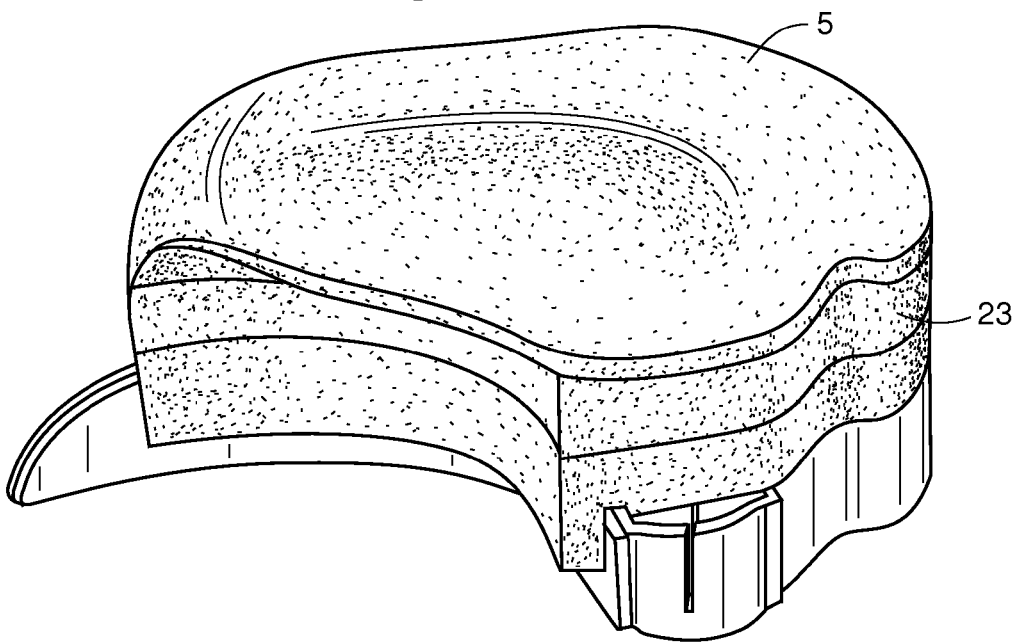
FIG. 12A illustrates the inside view of the mouse accoutrement with a straight level inserted in the middle of the cushion.
Figure 12B:
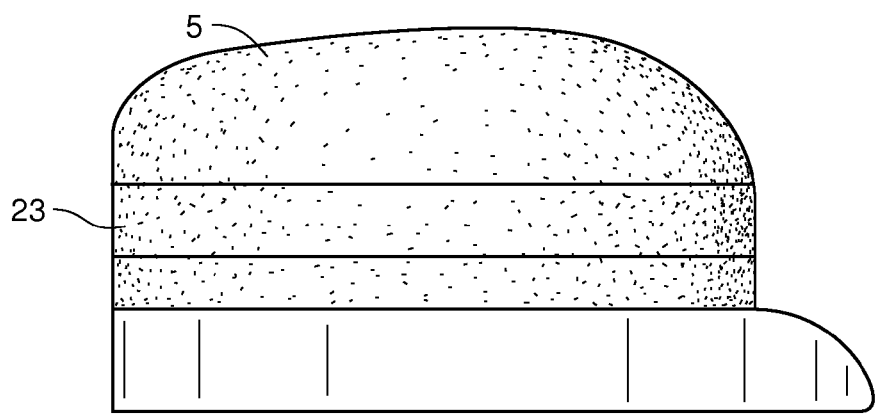
FIG. 12B illustrates the outside view of the mouse accoutrement with a straight level inserted in the middle of the cushion.

In some cases, the users, palm cheek below the thumb is thicker than the palm cheek below the pinky finger. For this reason, the height of the cushion must be comfortable and the top of the hand below the fingers must be level. By adding or removing a level to the cushion, the user can accomplish a level palm surface resulting in obtaining the maximum space for the carpal tunnel and a comfortable seat for the hand when working with a mouse. The straight level can be inserted into either the right cushion or the left cushion. FIGS. 12A and 12B illustrate an inside view and an outside view of an embodiment where a level 23 is inserted into cushion 5. In this embodiment, the cushions 5 are designed such that levels 23 can be easily inserted and removed if required. The level ensures that the height of the cushion can be raised, without limitation, to accommodate the differences in structure of the hand to ensure that the hand is horizontal and undistorted when resting on the cushion. Adding or removing levels does not change the space required by the carpal tunnel.

Figure 12C:
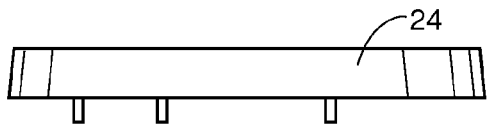
FIG. 12C illustrates anchors used to hold the level to the cushion.
Figure 12D:
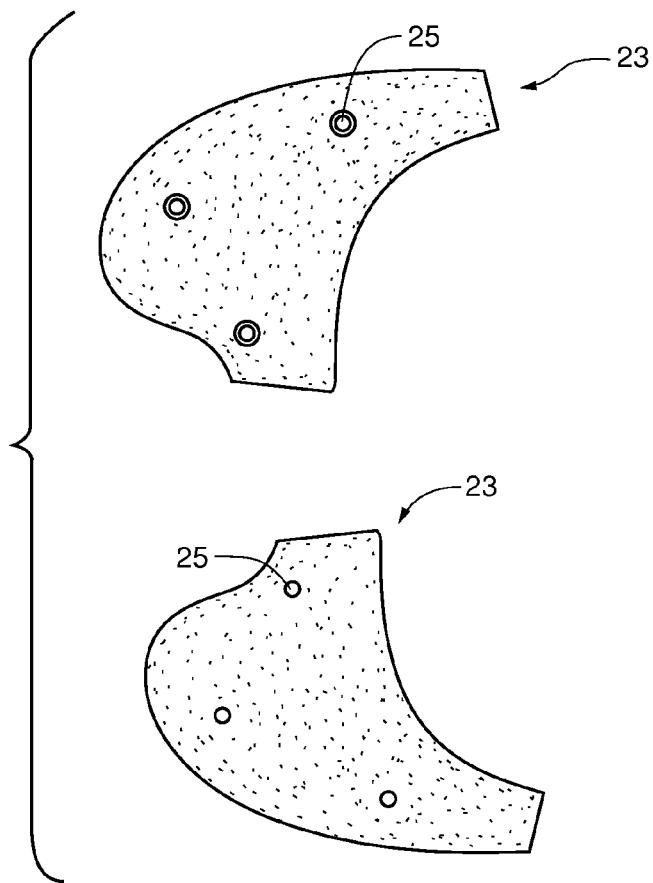
FIG. 12D illustrates a top and bottom view of the level which is installed in the mouse accoutrement.
Figure 12E:
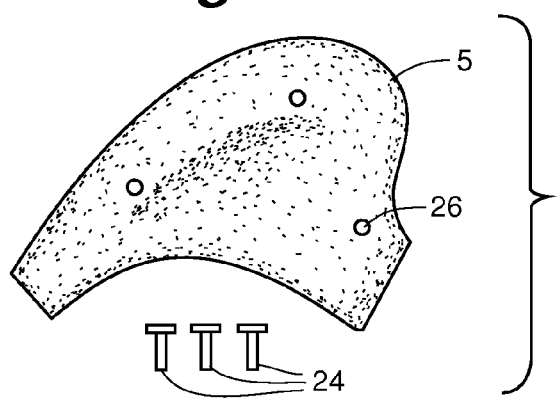
FIG. 12E illustrates the anchors which are inserted in the level and the slots on the cushion which receive the anchors stabilizing the level to the cushion.

An undistorted level can be accomplished in several different ways. In a preferred embodiment, as depicted in FIGS. 12C and 12D, the levels can then be held to the cushion using an anchor 24. To accomplish this, slots 25 are inserted into level 23 (FIG. 12D). The slots are designed to perfectly accommodate one end of an anchor 24. The other end of the anchor is inserted into corresponding slots on the cushion, thus fixiting the level in place. FIG. 12E illustrates that holes 26 are inserted into the cushion 5 to accommodate one end of anchor 24. When a level is inserted, the top of the cushions' anchors will fit into the slots 25 on the top of the level 23 where the other end of the anchor will fit into holes 26 of the cushion. To ensure a consistent series of holes allowing each anchor 24 to match each hole 25 without any variation, the holes 25 are drilled from the bottom of the cushion (5b in FIG. 13), through the level (23 in FIG. 13) to the bottom section of the top cushion (5a in FIG. 13).

To accommodate the levels, it may be necessary to create an opening in the cushion. This can be accomplished, for instance, by slicing the cushion at a location between its upper end and its lower end. The level, which is preferably made from the same material as the cushion, is then conveniently placed between the top of the sliced cushion and the bottom of the sliced cushion.

Figure 13:
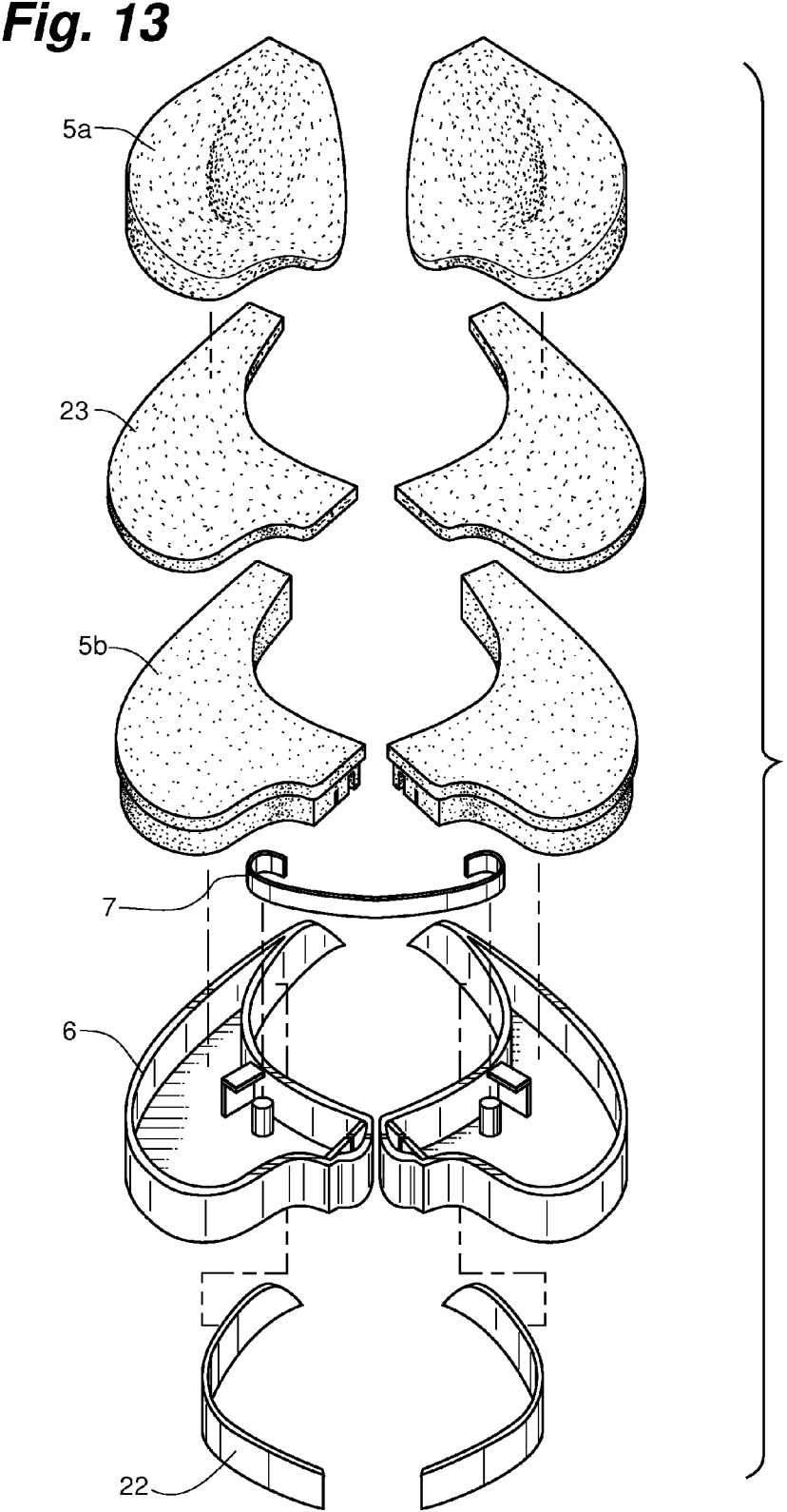
FIG. 13 illustrates individual parts comprising the accoutrement of the present invention with added levels.

FIG. 13 illustrates individual parts comprising the accoutrement of the present invention with added levels. In FIG. 13, cushion 5 is divided into two separate pieces, an upper piece 5a and a lower piece 5b to emphasize that the cushion must be sliced in order to accommodate level 23. Hence, cushion 5 is preferably made out of a single piece. However, in an alternative embodiment, the cushion can be made from separate pieces, a top piece and a bottom piece.

The mouse accoutrement of the present invention is simply made and does not require any additional attachments or adjustments. It surrounds the mouse and is held tight by the spring mechanism. The cushions of the invention are designed to emulate the shape of the human palm. This allows space for the Carpal Tunnel and maintains that space when using the mouse.

Computer Mouse

Figure 14:
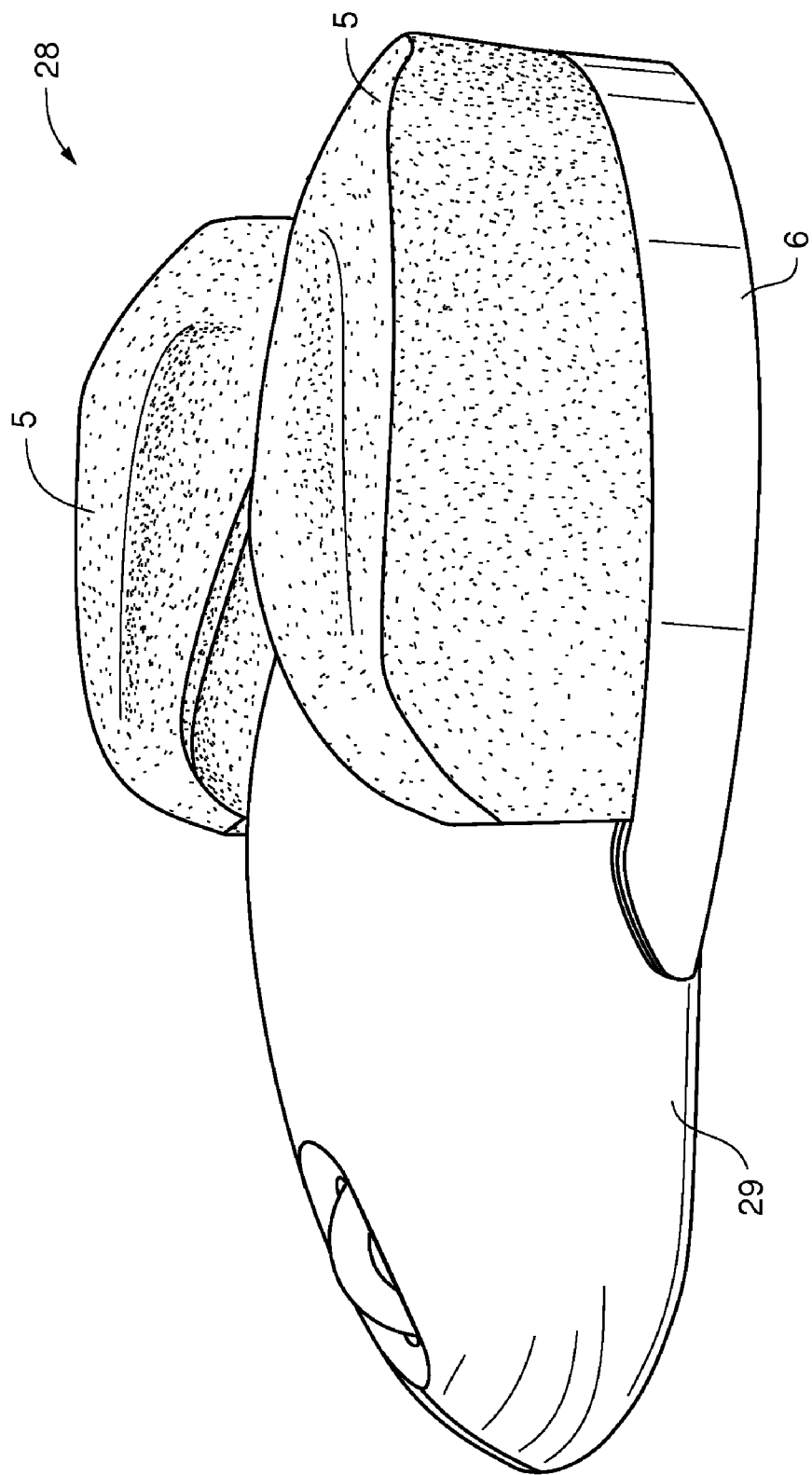
FIG. 14 illustrates a view of one embodiment of a computer mouse of the present invention.

We next turned our attention to developing an ergonomic computer mouse. The design of the new mouse was based on the principle of providing maximum comfort to the user while keeping the carpal tunnel substantially open. Our first design of a new mouse was based on the fully assembled mouse with mouse accoutrement, which is depicted in FIGS. 3 and 4. However, rather than keep the mouse, cushions and receptacles as separate units to be assembled together by the user, the three pieces may be permanently adhered to each other, forming a single unit, which is illustrated in FIG. 14. Accordingly, FIG. 14 depicts a fully assembled mouse 28, comprising cushions 5, receptacles 6 and mouse body 29. Preferably, mouse body 29 is adhered to the cushions 5 and receptacles 6 using a suitable adhesive. Relative to a standard commercially available mouse, the new mouse 28 shown in FIG. 14 is longer and provides a resting place for the cheeks of the hands of the user's palm while maintaining a space for the carpal tunnel.

While the mouse illustrated in FIG. 14 was quite effective in relieving stress and providing comfort to the user, the design is limited owing to the presence of the spring mechanism attaching the receptacle units. We reasoned that other configurations of the mouse may even be more optimal if they did not require a spring or a spring-like mechanism. To this end, we designed several different configurations of the base of a mouse that do not require a spring to hold individual units together. As discussed below, the novel mouse base can be combined with other components to form a fully assembled mouse with optimized performance and comfort level.

Figure 15:
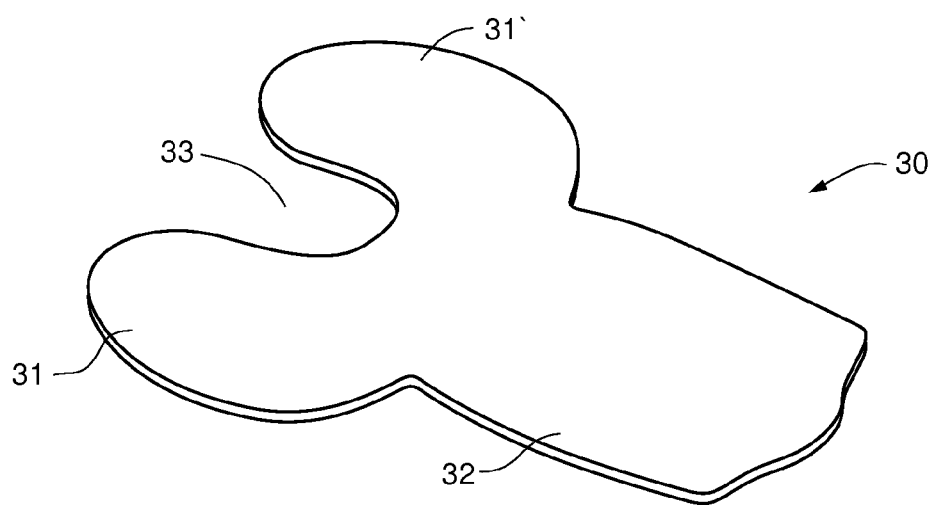
FIG. 15 illustrates a view of the base (lower portion) of a computer mouse of the present invention.

One particularly preferred configuration of such a mouse base is illustrated in FIG. 15. In FIG. 15, mouse base 30 is a single unit which is derived from a mold. The mouse base is preferably made from plastic, most preferably ABS plastic. The preferred molding is made from an injection molding process for the ABS plastic, which requires a steel mold with a cavity formed from a prototype of the mouse to produce thousands of mice using hydraulic pressure to force the molten ABS plastic through the steel mold. The mouse base is designed for sliding motion over a surface, such as a desk. For convenience, it is suitable to refer to mouse base 30 as having two symmetrical ears 31 and 31' and face 32 at the lower ends of the ears. In preferred embodiments, the ears 31 and 31' have a rounded shape that curve inward at the interior of the mouse base 30, thereby creating a natural space 33 between the ears. For instance, the ears may have a semicircular shape with an inward curvature, as depicted in FIG. 15. The shape of space 33 is defined by the inward curvature of ears 31 and 31'. Preferably, space 33 has a U-shape (as seen in FIG. 15), a V shape or a U shape terminating in a V shape. The face 32 of mouse base 30 resembles the base (bottom portion) of a conventional mouse. Preferably, the base 30 has a rectangular or oval shape. As discussed below, the face 32 of mouse base 30 is designed to accommodate the curvilinear top portion of the mouse, including the left and right buttons and the scroll wheel.

Figure 16A:
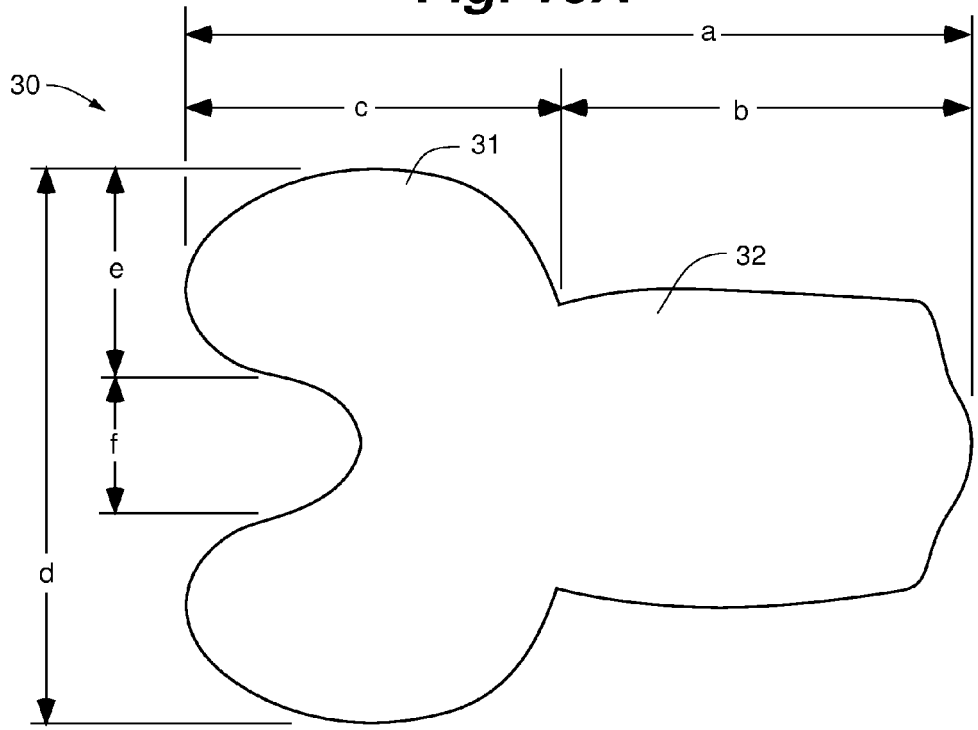
FIGS. 16A and 16B illustrate a top view and bottom view, respectively, of the base of a computer mouse of the present invention.
Figure 16B:
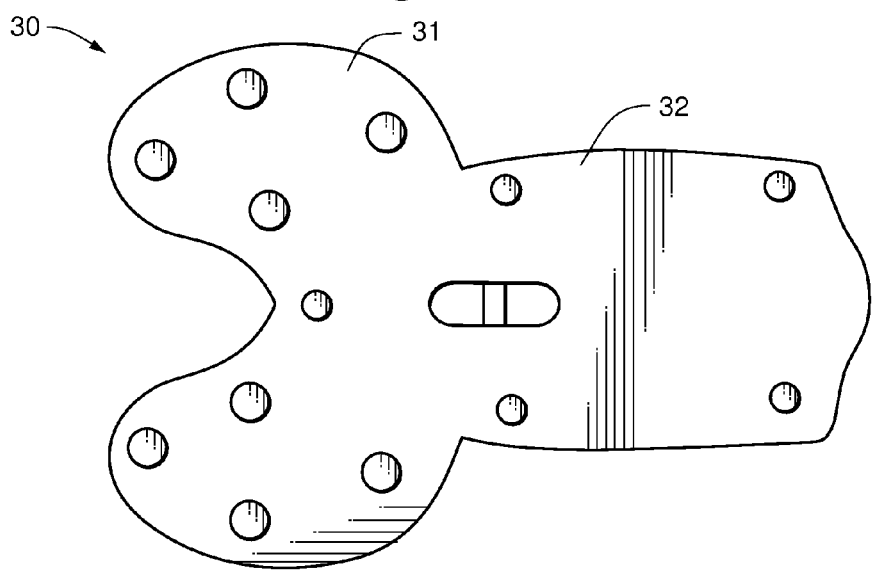

FIG. 16A shows a top view of mouse base 30. FIG. 16B shows the bottom view of mouse base 30. In FIG. 16A, mouse base 30 is broken down into particular dimensions (a, b, c, d, e and f) by length or width. The entire length of mouse base 30 (dimension a in FIG. 16A) may vary preferably between about 5.5 inches to about 6.5 inches, and most preferably from about 6 inches to about 6.5 inches. Notably, these lengths approximate the sizes of typical human hands when measured from the tip of the middle finger to the bottom of the palm. The lengthwise dimension is conveniently broken into two particular lengths, the lengths of the face 32 (dimension b in FIG. 16A) and the length of ears 31 and 31' (dimension c in FIG. 16A). The length of the face 32 preferably varies from about 3.0 inches to about 3.5 inches. The length of the ears preferably varies from between about 2.5 inches to about 3 inches These lengths are chosen so that when in use, the cheeks of the palm rest comfortably on ears 31 and 31'. The width of the mouse when taken from the outer most portions of ears 31 and 31' (dimension d in FIG. 16A) may vary between about 4.0 inches to about 5.5 inches, and preferably from about 4.2 inches to about 5.0 inches. Notably, these lengths approximate the widths of typical human palms. The width of the ears 31 and 31' (dimension e in FIG. 16A) may vary from about 1.3 inches to about 2.0 inches, and most preferably from about 1.5 inches to about 2.0 inches. The width of the space between the ears taken from two adjacent points in the center of the ears (dimension f in FIG. 16A) may vary between about 1.0 inch to about 2.0 inches and more preferably from about 1.25 inches to about 1.5 inches. These lengths ensure that when in use, the carpal tunnel of the hand remains completely open.

After manufacturing mouse base 30, the remaining parts of the mouse may be assembled by conventional means. For instance, in one embodiment, the printed circuit board (PCB) of the mouse along with the encoder mechanism is inserted into mouse base 30. Next, the top part of the mouse, including the left and right buttons are screwed and/or snapped into mouse base 30. Similar to mouse base 30, the top portion of the mouse is made from an injection molding process.

Figure 17A:
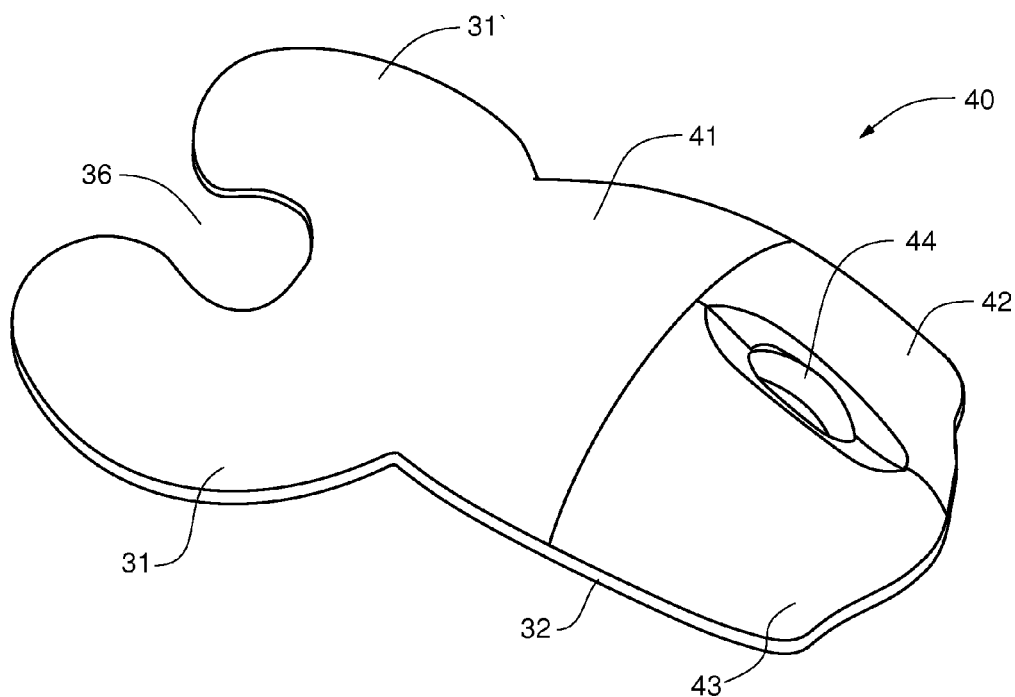
FIGS. 17A and 17B illustrate a top view and side view, respectively, of one embodiment of a computer mouse of the present invention.
Figure 17B:
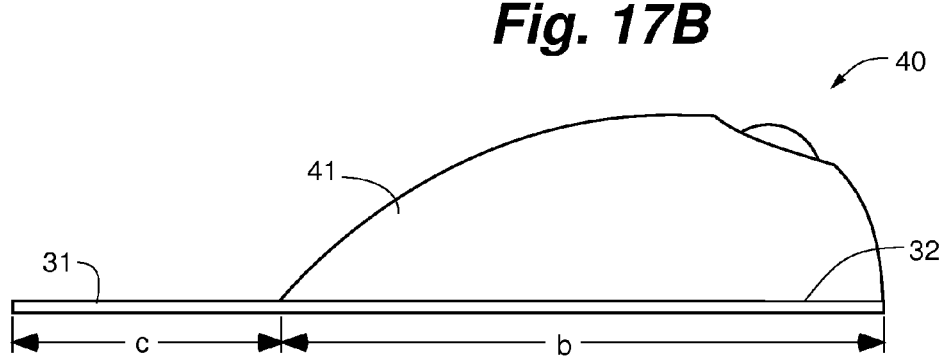

A preferred embodiment of a fully assembled mouse of the present invention is illustrated in FIGS. 17A and 17B. FIG. 17A shows a view of the mouse 40 from the top. FIG. 17B shows a view of mouse 40 from the side. Dimensions b and c are identical to those described in FIG. 16A. The mouse 40 is comprised of a mouse base 30 which includes mouse face 32 and ears 31 and 31'. A curvilinear upper portion 41 of mouse 40 sits on top of the back end of mouse face 32. The curvilinear portion 41 supports the portion of a user's palm directly below the fingers. Right button 42 and left button 43 are assembled directly on top of mouse face 32, towards the front end. The curvilinear portion 41, the right button 42 and the left button 43 are preferably assembled to mouse face 32 by either snapping or screwing the parts in place. Additionally, scroll wheel 44 sits between right button 42 and left button 43. In a preferred embodiment, scroll wheel 44 is in the same latitudinal plane as the center of natural space 36.

The mouse 40 depicted in FIGS. 17A and 17B serves several purposes. First, the presence of ears 31 and 31' elongate the mouse both lengthwise and widthwise. Second, the ears 31 and 31' provide a comfortable resting place for the cheeks of the hand. Third, the presence of the space 36 between the ears prevents any contact between the carpal tunnel of the user's hand and the mouse. The combination of these features effectively prevents the carpal tunnel of the user's hand from narrowing. Accordingly, use of mouse 40 mitigates the effects of stress-related disorders, particularly CTS. However, because the top portion of mouse 40 preferably has a curvilinear shape, the arch of curvilinear portion 41 is situated higher than the ears 31 and 31'. Such a configuration may not maximize comfort to some users because it keeps the hand in an arched rather than a straight position.

Figure 18A:
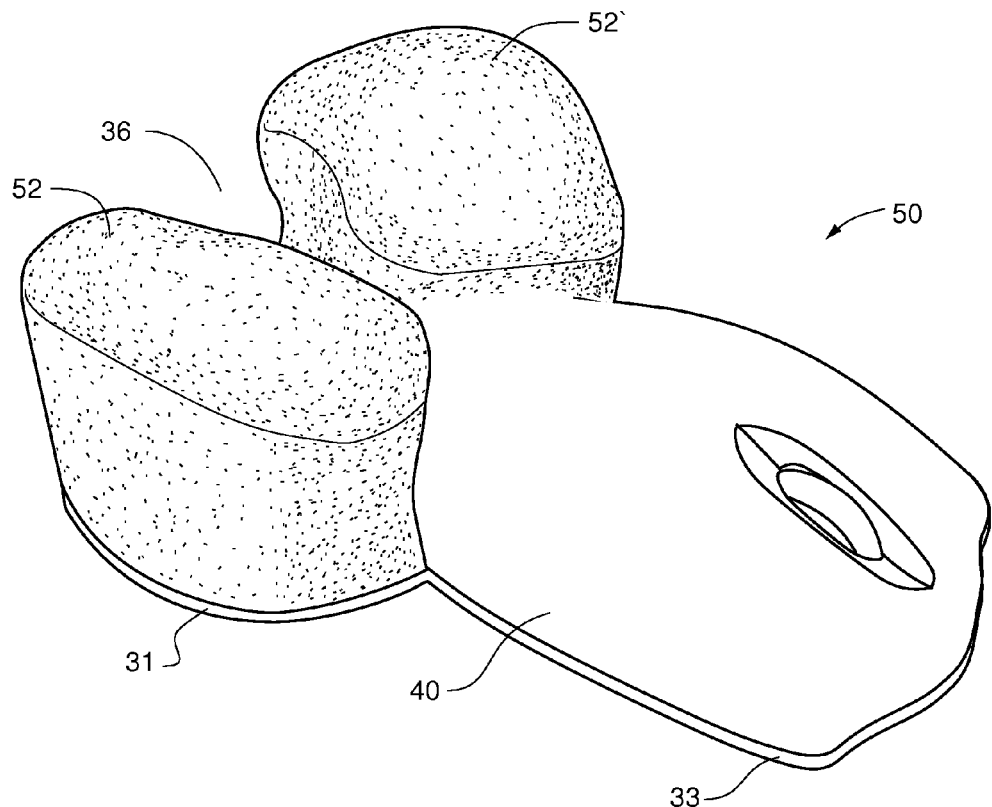
FIGS. 18A and 18B illustrate a top view and side view, respectively, of one embodiment of a computer mouse with permanently attached cushions of the present invention.

Accordingly, in a preferred embodiment of the present invention (shown in FIG. 18A), cushions are attached to the ears 31 and 31' to raise the level of the rear of the mouse. In FIG. 18A, mouse 50 is comprised of mouse body 40 and cushions 52 and 52'. Here, the mouse body 40 is identical to the mouse depicted in FIG. 17A. However, in this embodiment, cushions 52 and 52' are assembled directly on top of the ears 31 and 31'. Preferably, the cushions 52 and 52' completely cover the ears 31 and 31'. Natural space 36 sits between the cushions. The cushions are preferably made from natural rubber or polyethylene foam, and most preferably, from natural rubber. The cushions serve a similar function as they did in the mouse accoutrement, discussed above. The bottom of the cushions 52 and 52' have an identical shape to the shape of the top portions of ears 31 and 31'. Accordingly, following the manufacture of mouse body 40, the cushions are preferably adhered to the mouse body using a suitable adhesive, thus generating fully assemble mouse 50.

Figure 18B:
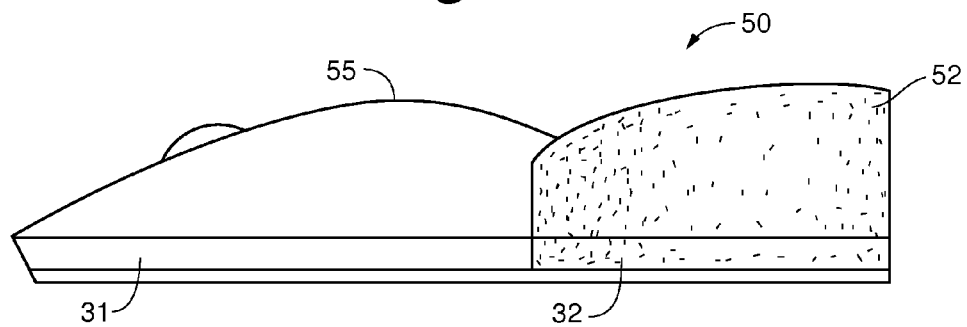

FIG. 18B shows a side view of mouse 50. It can be appreciated from this viewpoint that the height of the back portion of the mouse, with assembled cushions, approximates the maximum height 55 of the curvilinear portion of the mouse. In alternative embodiments, the cushions may be elevated higher than the maximum height of the curvilinear portion 55 of the mouse. The height of the cushions 52 and 52' will vary depending upon the comfort and size of the hand and cheeks of the palm. In a preferred embodiment, the height of the cushion is between 0.75 inches and 2 inches. In a more preferred embodiment, the height of the cushion is between 1.25 inches and 1.75 inches. In a preferred embodiment, the upper portion of cushions 52 and 52' have a shape that resembles the three-dimensional anatomy of the human palm. Manufacture of such cushions was discussed above with respect to the mouse accoutrement embodiment.

Figure 19A:
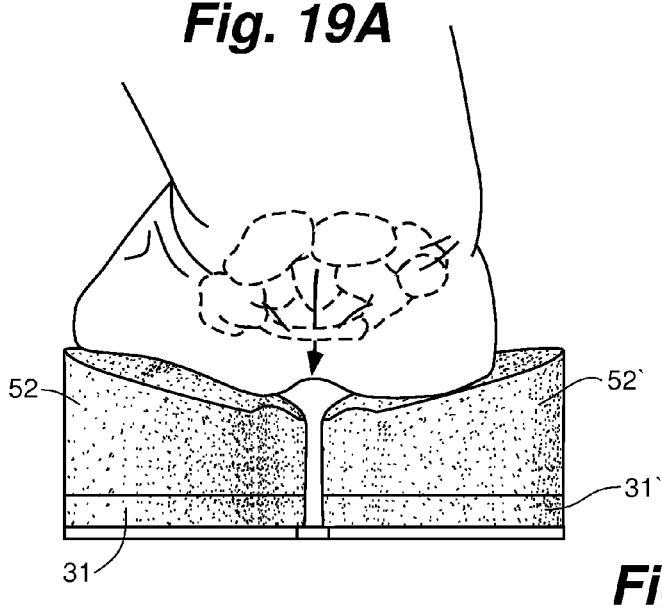
FIG. 19A illustrates the back view of a computer mouse with permanently attached cushions of the same height.
Figure 19B:
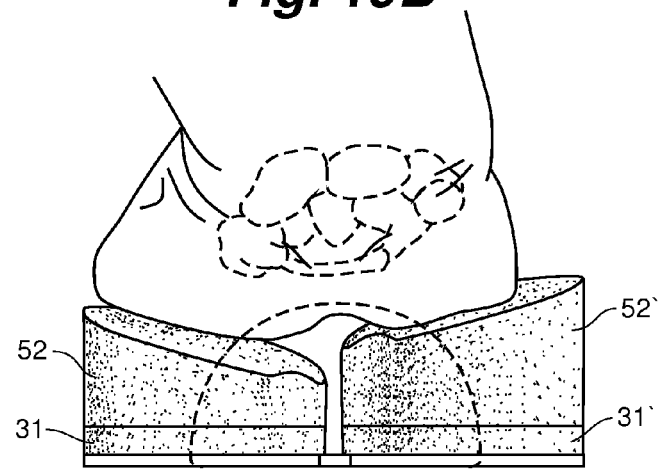
FIG. 19B illustrates the back view of a computer mouse with permanently attached cushions of different heights.

As depicted in the back view of mouse 50 (FIG. 19A), cushions 52 and 52' of mouse 50 may be designed to be of identical heights. Alternatively, as depicted in FIG. 19B, cushions 52 and 52' may be of different heights. It is noted that most human hands are thinner on the outside of the hand (the pinky side) and thicker on the inside of the hand (thumb side). Hence, in the embodiment illustrated in FIG. 19B, the cushion 52' on the pinky side is slightly higher than the cushion 52 on the thumb side. This arrangement ensures that the surface of the palm is even on both sides of the hand.

Figure 20:
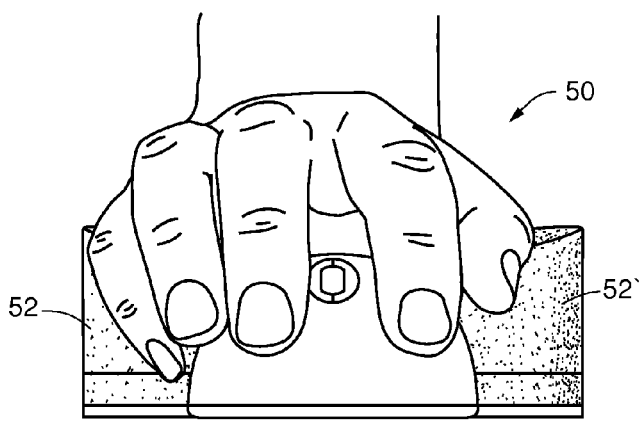
FIG. 20 illustrates a view of a computer mouse of the present invention when in use.

FIG. 20 illustrates a view of mouse 50 when in use. In use, the cheeks of the palms rest comfortably on the cushions. The space created between the cushions 52 and 52' ensures that the carpal tunnel is kept open when the mouse is being used. Notably, the mouse is elongated and split in the back which, in addition to being the base of the standard mouse, provides a platform for two sides of the back of the mouse where cushions for the back of the mouse support the palm of the user. It also maintains the natural structured space of the carpal tunnel.

Figure 21A:
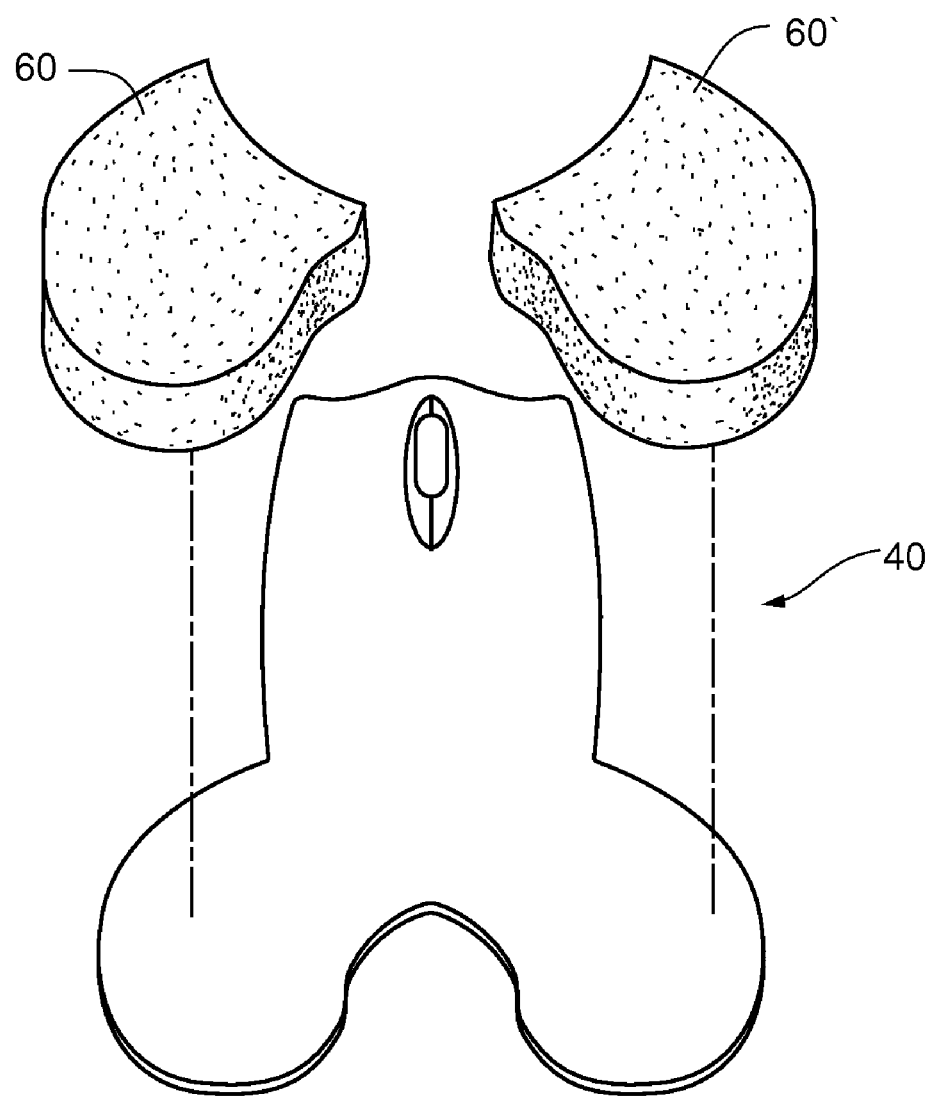
FIGS. 21A-B illustrate a top view of a mouse body assembled with foam layers.
Figure 21B:
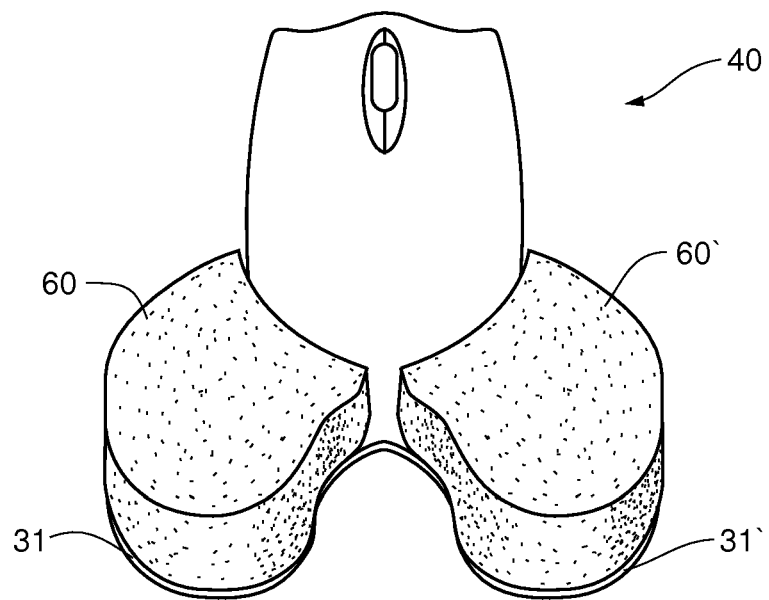
Figure 21C:
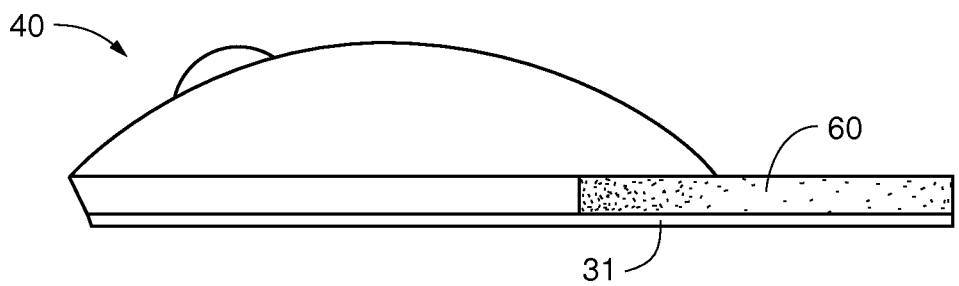
FIG. 21C illustrates a side view of a mouse body assembled with a foam layer.
Figure 22:
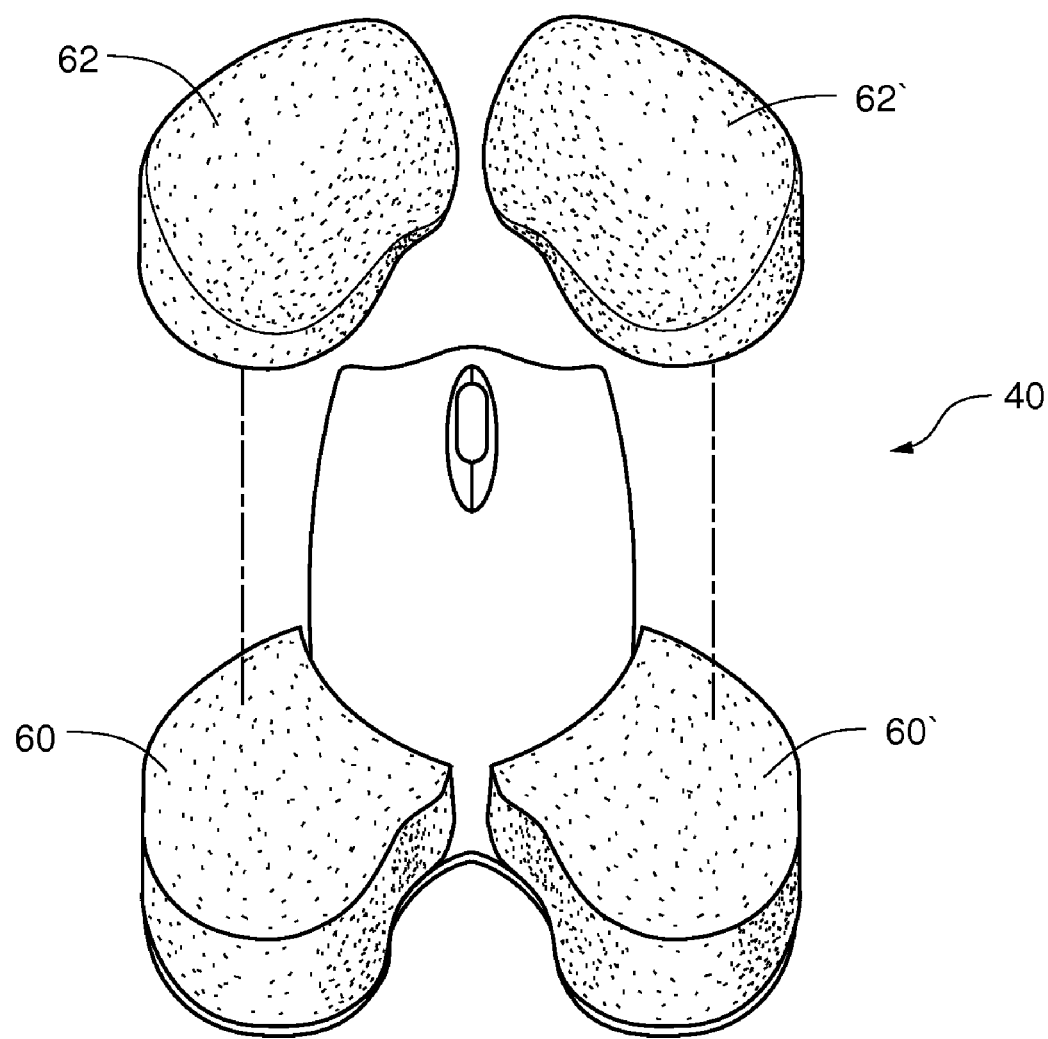
FIG. 22 illustrates a mouse of the present invention provided as a kit.

In the embodiment shown in FIG. 18A, the cushions 52 and 52' are permanently adhered to mouse base 40. In an alternative embodiment, the mouse base and the cushions may be preassembled prior to use by the user. To simplify such an assembly, it is convenient to add two layers of foam 60 and 60', about 2.0 inches high to the ears 31 and 31' of mouse body 40, as shown in FIG. 21A. Foam layers 60 and 60' will thus be permanently adhered to mouse body 40, as depicted in FIG. 21B (top view) and 21C (side view). The top of foam layers 60 and 60' preferably will include a suitable adhesive which allows the user to conveniently attach a cushion. As such, the mouse base and the cushions could be provided as a kit which is assembled by the user. Such a kit is depicted in FIG. 22. The kit includes the mouse body 40 with attached foam layers 60 and 60' and cushions 62 and 62'. The kit may include more than one set of cushions with variable heights. The advantage of such a kit is that it allows the user to assemble the mouse to the appropriate height for that user, as opposed to the embodiment shown in FIG. 18A, where the cushions are permanently attached to the mouse body. Moreover, levels may be provided to accommodate the range of different shapes and sizes of the human hand, as discussed with respect to the mouse accoutrement.

While the preferred embodiments have been illustrated above, it will be apparent to those of ordinary skill in the art that many modifications may be made without departing from the concepts sets forth herein.

What is claimed is:

1. A computer mouse comprising:
    A base for sliding movement on a surface, said base having a front section and a rear section integrally formed, said rear section having two symmetrical rounded areas that curve inward at an interior of the base thereby forming a natural space there between; and an upper curved surface for support of fingers and an upper palm area of a user's hand, said curved surface mechanically adhered to the front section of the base, wherein the rear section of the base provides support for a lower palm area of a user's hand and the natural space keeps a carpal tunnel of the user's hand substantially open.

2. The computer mouse of claim 1, wherein the natural space is U-shaped.

3. The computer mouse of claim 1, wherein the natural space is V-shaped.

4. The computer mouse of claim 1, wherein the rounded areas are semicircular.

5. The computer mouse of claim 1, wherein a length of the front section of the base is in a range from about 3 inches to about 3.5 inches and a length of the rear section of the base is in a range from about 2.5 inches to about 3.0 inches.

6. The computer mouse of claim 1, wherein a width of each of the symmetrical rounded areas is in a range from about 1.5 inches to about 2.0 inches.

7. The computer mouse of claim 1, wherein a width of the natural space is in a range from about 1.25 inches to about 1.50 inches.

8. The computer mouse of claim 1, wherein the upper curved surface has a left button and a right button at its front end and a scroll wheel there between.

9. The computer mouse of claim 1, wherein a scroll wheel and a center of the natural space are at the same latitudinal plane.

10. The computer mouse of claim 1, wherein the front section of the base has a rectangular shape.

11. The computer mouse of claim 1, wherein the front section of the base has an oval shape.

12. A computer mouse comprising:
    A base for sliding movement on a surface, said base having a front section and a rear section integrally formed, said rear section having two symmetrical rounded areas that curve inward at an interior of the base thereby forming a natural space there between;
    an upper curved surface for support of fingers and an upper palm area of a user's hand, said curved surface mechanically adhered to the front section of the base; and
    two cushions mechanically adhered to the a two rounded areas,
    wherein the rear section of the base provides support for a lower palm area of a user's hand and the natural space keeps a carpal tunnel of the user's hand substantially open.

13. The computer mouse of claim 12, wherein said are cushions configured to be shaped in a form of a human palm.

14. The computer mouse of claim 12, wherein a height of said cushions is between about 0.75 inches and about 2 inches.

15. The computer mouse of claim 12, wherein a height of said cushions is between about 1.25 inches and about 1.75 inches.

16. The computer mouse of claim 12, wherein a maximum height of the cushions is higher than a maximum height of the upper curved surface.

17. The computer mouse of claim 12, wherein a length of the front section of the base is in a range from about 3 inches to about 3.5 inches and a length of the rear section of the base is in a range from about 2.5 inches to about 3.0 inches.

18. The computer mouse of claim 12, wherein a width of each of the symmetrical rounded areas is in a range from about 1.5 inches to about 2.0 inches.

19. The computer mouse of claim 12, wherein a width of the natural space is in a range from about 1.25 inches to about 1.5 inches.

20. The computer mouse of claim 12, wherein the upper curved surface has a left button and a right button at its front end and a scroll wheel there between.

21. The computer mouse of claim 12, wherein a scroll wheel and a center of the natural space are at the same latitudinal plane.

22. The computer mouse of claim 12, wherein the cushion for a pinky side of the user's hand rests higher than a cushion for a thumb side of the user's hand.

23. A kit for assembling a computer mouse comprising:

A mouse body having a base for sliding movement on a surface, said base having a front section and a rear section integrally formed, said rear section having two symmetrical rounded areas that curve inward at an interior of the base thereby forming a natural space there between, and an upper curved surface for support of fingers and an upper palm area of a user's hand, said curved surface mechanically adhered to the front section of the base, wherein the two symmetrical areas have two foam layers adhered thereto; and two cushions with a bottom surface adapted to be adhered to an upper surface of the foam layers.

24. The kit of claim 23, wherein said cushions are configured to be shaped in a form of a human palm.

25. The kit of claim 23, wherein the cushions are made from natural rubber.

* * * * *